United States Patent
Shima et al.

(10) Patent No.: US 10,520,135 B2
(45) Date of Patent: Dec. 31, 2019

(54) VACUUM HEAT-INSULATING MATERIAL, AND HEAT-INSULTING CONTAINER, DWELLING WALL, TRANSPORT MACHINE, HYDROGEN TRANSPORT TANKER, AND LNG TRANSPORT TANKER EQUIPPED WITH VACUUM HEAT-INSULATING MATERIAL

(71) Applicant: Panasonic Intellectual Property Management Co., Ltd., Osaka (JP)

(72) Inventors: Michihiro Shima, Hyogo (JP); Akiko Yuasa, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/978,707

(22) Filed: May 14, 2018

(65) Prior Publication Data
US 2018/0259126 A1    Sep. 13, 2018

Related U.S. Application Data

(62) Division of application No. 15/504,583, filed as application No. PCT/JP2016/002022 on Apr. 14, 2016, now Pat. No. 10,001,247.

(30) Foreign Application Priority Data

Apr. 28, 2015 (JP) .................. 2015-091711
Dec. 22, 2015 (JP) .................. 2015-249784

(51) Int. Cl.
*F17C 3/08* (2006.01)
*B63B 25/16* (2006.01)
(Continued)

(52) U.S. Cl.
CPC ............... *F17C 3/08* (2013.01); *B63B 25/16* (2013.01); *E04B 1/7612* (2013.01); *E04B 1/80* (2013.01);
(Continued)

(58) Field of Classification Search
CPC .................................................... B63B 25/16
(Continued)

(56) References Cited

U.S. PATENT DOCUMENTS

2005/0121903 A1   6/2005 Offredi
2007/0196665 A1*  8/2007 Tenra .................. B32B 7/12
                                                        428/416
(Continued)

FOREIGN PATENT DOCUMENTS

DE    102006056821 A1 *  6/2008 .............. B63B 25/16
DE    102006056821 A1    6/2008
(Continued)

OTHER PUBLICATIONS

International Search Report and Written Opinion dated Jun. 14, 2016, issued in corresponding International Application No. PCT/JP2016/002022. (w/ English translation).
(Continued)

*Primary Examiner* — Brent T O'Hern
(74) *Attorney, Agent, or Firm* — McDermott Will & Emery LLP

(57) ABSTRACT

A vacuum heat-insulating material includes: an outer cover material; and a core material which is sealed in a tightly closed and decompressed state on the inside of the outer cover material. Outer cover material has gas barrier properties and satisfies at least one of a condition that a linear expansion coefficient is $80 \times 10^{-5}/°$ C. or lower when a static load is 0.05 N within a temperature range of $-130°$ C. to $80°$ C., inclusive, a condition that an average value of a linear expansion coefficient is $65 \times 10^{-5}/°$ C. or higher when a static load is 0.4 N within a temperature range of $-140°$ C. to $-130°$ C., inclusive, a condition that an average value of a linear expansion coefficient is $20 \times 10^{-5}/°$ C. or higher when a static load is 0.4 N within a temperature range of $-140°$ C. to $-110°$ C., inclusive, and a condition that an average value of a linear expansion coefficient is $13 \times 10^{-5}/°$ C. or higher when a static load is 0.4 N within a temperature range of $+50°$ C. to $+65°$ C., inclusive.

9 Claims, 8 Drawing Sheets

(51) Int. Cl.
F17C 3/04 (2006.01)
F16L 59/065 (2006.01)
E04B 1/80 (2006.01)
E04B 1/76 (2006.01)

(52) U.S. Cl.
CPC .............. *E04B 1/803* (2013.01); *E04B 1/806* (2013.01); *F16L 59/065* (2013.01); *F17C 3/04* (2013.01); *F17C 2203/0391* (2013.01); *F17C 2203/0636* (2013.01); *F17C 2221/012* (2013.01); *F17C 2221/033* (2013.01); *F17C 2270/0171* (2013.01); *Y02A 30/242* (2018.01); *Y02B 80/12* (2013.01); *Y02E 60/321* (2013.01)

(58) Field of Classification Search
USPC .......................................................... 428/69
See application file for complete search history.

(56) References Cited

U.S. PATENT DOCUMENTS

2014/0366480 A1 12/2014 Smith
2015/0344173 A1 12/2015 Kojima et al.

FOREIGN PATENT DOCUMENTS

| JP | H05-12899 U | 2/1993 |
| JP | 2004-036749 A | 2/2004 |
| JP | 2004-293756 A | 10/2004 |
| JP | 2008-240924 A | 10/2008 |
| JP | 2009-127683 A | 6/2009 |
| JP | 2014-206275 A | 10/2014 |
| KR | 10-2007-0021235 A | 2/2007 |
| WO | 95/016166 A1 | 6/1995 |
| WO | 2014/097630 A1 | 6/2014 |
| WO | 2014/32661 A1 | 9/2014 |
| WO | 2014/132665 A1 | 9/2014 |

OTHER PUBLICATIONS

The Extended European Search Report dated May 31, 2017 for the related European Patent Application No. 16786117.8.
Exhibit A—No. 3 (Overview of Patent Law [12th edition], pp. 56-59, pp. 128-135, pp. 492-493, issued by Yuhikaku Publishing Co., Ltd on Dec. 20, 1997).
Exhibit A—No. 4 (Thermal Expansion of Ceramic Material around Room Temperature, Annual Report of the Ceramics Research Laboratory (2009), vol. 9, pp. 43-48, issued by the Ceramics Research Laboratory in the Nagoya Institute of Technology in 2009).
Exhibit A—No. 5 (Polymer Material at Very Low Temperature, Polymer, vol. 26, August issue (1977), pp. 563-567, Issued by The Society of Polymer Science in 1977).
Exhibit A—No. 6 (Frontier of Transparent Plastic, pp. 94-105, Polymer Frontier 21 Series No. 27, issued by NTS Inc. on Oct. 5, 2006).
Exhibit A—No. 7 (Collection of Measurement Data on Heat Analysis in Various Materials, pp. 56-59, pp. 80-83, issued by Technical Information Institute Co., Ltd. on May 30, 2008).
Exhibit A—No. 8 (Handbook of Chemistry: Applied Chemistry, pp. 1122-1127, issued by Maruzen Company, Limited on Jul. 15, 1990).
Exhibit A—No. 9 (Types and Features of Kapton, downloaded on Oct. 31, 2017 from the web page, http://www.td-net.co.jp/kapton/sort/en_type/heat.html, prepared by Du-Pont-Toray Co., Ltd. (the preparation date is unclear)).
Exhibit A—No. 10 (Consideration of Heat Stress of Composite Cylinder of Aluminum Alloy and Steel in Consideration of Temperature Dependency of Material Constant, Light Metals (1978), vol. 28, No. 5, pp. 247-252, issued by The Japan Institute of Light Metals in 1978.
Exhibit A—No. 11 (Watanabe Shoji Corporation/ high-low temperature tensile properties, downloaded on Dec. 5, 2017 from the web page, http://www.zerocut-watanabe.co.jp/pg321.html, prepared by Watanabe Shoji Corporation (the preparation date is unclear)).
Exhibit A—No. 12 (Evaluation of Extremely Low Temperature Mechanical Properties of Plastic, issued by The Society of Materials Science, Japan on May 23, 2001, Technical papers of academic lectures, vol. 50, No. 412, pp. 107-108).
Exhibit A—No. 13 (AURUM super heat resistant/thermoplastic polyimide resin, AURUM, catalog issued by Mitsui Chemicals, Inc. on Aug. 10, 2012).
Exhibit A—No. 14 (Report on Results of Measurement of Linear Expansion Coefficient of Vacuum Heat-Insulating Material for Use in Refrigerator, prepared by DJK Corporation on Dec. 11, 2017).
Exhibit A—No. 15 (Document which explains the operation to remove vacuum heat-insulating material from refrigerator, prepared by the Opponent on Dec. 8, 2017 using the photograph prepared by DJK Corporation).
Exhibit A—No. 16 (Press release of refrigerator, downloaded on Nov. 30, 2017 from the web page, http://news.panasonic.com/jp/press/data/2012/08/jn120821-1/jn120821-1.html, prepared by Panasonic Corporation (the preparation date is unclear)).
Exhibit A—No. 17 (web pages of Kakaku.com, downloaded on Nov. 30, 2017 from the web pages, http://weview.kakaku.com/review/K0000409721/ReviewCD=652695 and http://weview.kakaku.com/bbs/J0000002721/SortID=16618547, prepared by Kakaku.com, Inc. (the preparation date is unclear)).
Exhibit A—No. 18 (Extremely low temperature to high temperature/ polyimide resin, downloaded on Nov. 1, 2017 from the web page http://toyometal-polychemical.jp/polyimide.html prepared by Toyometal Polychemical Co., Ltd. (the preparation date is unclear)).

\* cited by examiner

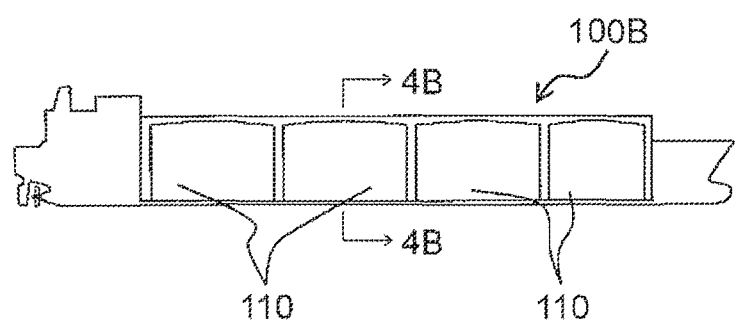
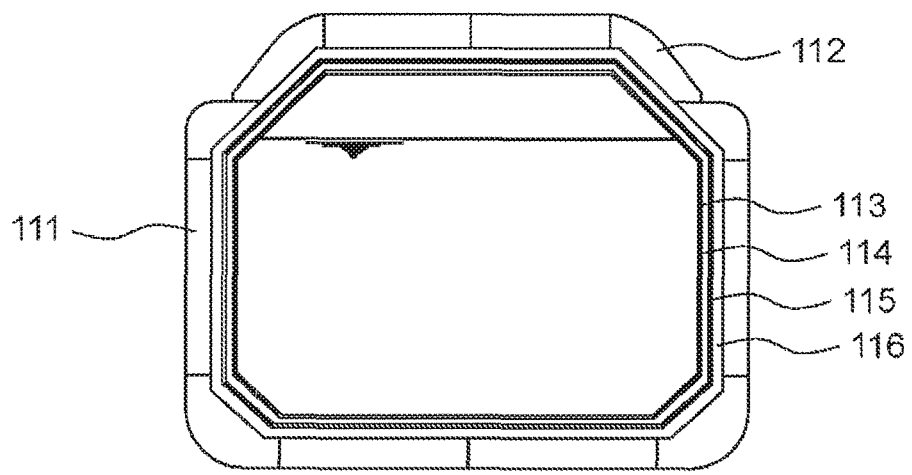

VACUUM HEAT-INSULATING MATERIAL, AND HEAT-INSULTING CONTAINER, DWELLING WALL, TRANSPORT MACHINE, HYDROGEN TRANSPORT TANKER, AND LNG TRANSPORT TANKER EQUIPPED WITH VACUUM HEAT-INSULATING MATERIAL

This application is a Divisional of U.S. patent application Ser. No. 15/504,583, filed Feb. 16, 2017, which is the U.S. national stage application of the PCT International Application No. PCT/JP2016/002022 filed on Apr. 14, 2016, which claims the benefit of foreign priority of Japanese patent application 2015-091711 filed on Apr. 28, 2015 and Japanese patent application 2015-249784 filed on Dec. 22, 2015, the contents all of which are incorporated herein by reference.

TECHNICAL FIELD

The present invention relates to a vacuum heat-insulating material having a configuration in which a core material is sealed in a tightly closed and decompressed state on the inside of an outer cover material, and a heat-insulating container, a dwelling wall, a transport machine, a hydrogen transport tanker, and an LNG transport tanker equipped with the vacuum heat-insulating material.

BACKGROUND ART

A vacuum heat-insulating material has a configuration in which a core material is tightly closed and decompressed and sealed on the inside of an outer cover material (outer package material) having gas barrier properties. As the outer cover material, generally, a laminated film on which functional layers, such as a thermal welding layer, a front surface protecting layer, and a gas barrier layer, are laminated is used.

The vacuum heat-insulating material is widely used in consumer products, such as electric appliances or housing materials, but in recent years, the use thereof has been further investigated in industrial products. Examples of the industrial product include a ship, such as a gas tanker, a heat-insulating container for holding low-temperature fluid, such as an LNG (liquefied natural gas) tank, and a vehicle (for example, for maintaining a temperature of a vehicle body, an engine, a transmission, or battery).

When the outer cover material is damaged, the gas barrier properties of the vacuum heat-insulating material are lost or deteriorate, and thus, it becomes difficult to maintain a substantially vacuum state (tightly closed and decompressed state) on the inside of the vacuum heat-insulating material. Here, from the related art, a technology of improving strength or durability of the outer cover material is suggested. For example, in PTL 1, a vacuum heat-insulating material in which a general refrigerator, a freezing machine, and a cooling and heating machine are assumed and pin-hole resistance of the outer cover material is improved, is disclosed. In the vacuum heat-insulating material, as the thermal welding layer of the outer cover material, a film in which tensile elongations in the longitudinal direction and in the lateral direction are respectively equal to or greater than 400% and the tensile elongation in the longitudinal direction with respect to the tensile elongation in the lateral direction is equal to or less than two times, is used.

However, in the industrial product, compared to the consumer product, there is a tendency that requiring properties of the vacuum heat-insulating material are strict. For example, in the ship, such as the above-described gas tanker, since the low-temperature fluid having a temperature which is substantially lower than a normal temperature is held for a long period of time, the vacuum heat-insulating material is used for a long period of time under the low-temperature environment. In addition, when performing maintenance of the ship, since there is a case of being exposed to a temperature which is higher than the normal temperature, the vacuum heat-insulating material is used not only under the low-temperature environment but also under the environment where an extremely large temperature difference is generated (for convenience, high-temperature difference environment). Furthermore, in the ship, compared to the consumer product, the use (for example, several tens of years) for a longer period of time is assumed, and thus, in the vacuum heat-insulating material, reliability for a longer period of time is acquired.

Here, under the low-temperature environment, according to a change or the like in an outdoor temperature, expansion and contraction of the outer cover material is generated, and thus, in the outer cover material, repetitive expansion and contraction stress is generated. In addition, under the high-temperature difference environment, in the outer cover material, large thermal stress which follows the temperature difference is generated. In this manner, reliability of the vacuum heat-insulating material for a long period of time is realized, and further, long-term durability of the outer cover material is acquired.

However, in the related art, in the vacuum heat-insulating material, in order to make it possible to employ the vacuum heat-insulating material in the industrial product, at least one of the strength and the durability of the outer cover material is improved, and further optimization of reliability of the outer cover material is rarely investigated. Furthermore, in the consumer product, for example, in a dwelling wall, in order to make it possible to correspond to the use in an extremely cold place, there is also a case where properties which can stand an extremely low outdoor temperature are required. However, in the related art, as the properties required in the vacuum heat-insulating material, such a condition which is stricter than a normal condition is rarely assumed.

CITATION LIST

Patent Literature

PTL 1: Japanese Patent Unexamined Publication No. 2004-036749

SUMMARY OF THE INVENTION

In order to solve the problem, the present invention further optimizes reliability of an outer cover material in a vacuum heat-insulating material to make it possible to employ the vacuum heat-insulating material in an industrial product.

A vacuum heat-insulating material of the present invention includes: an outer cover material including at least a resin component; and a core material which is sealed in a tightly closed and decompressed state on the inside of the outer cover material. In addition, the outer cover material has gas barrier properties and satisfies at least one of (1) a condition that a linear expansion coefficient is $80\times10^{-5}/°$ C. or lower when a static load is 0.05 N within a temperature range of $-130°$ C. to $80°$ C., inclusive, (2) a condition that an average value of a linear expansion coefficient is 65× $10^{-5}$/° C. or higher when a static load is 0.4 N within a temperature range of −140° C. to −130° C., inclusive, (3) a condition that an average value of a linear expansion coefficient is 20×$10^{-5}$/° C. or higher when a static load is 0.4 N within a temperature range of −140° C. to −110° C., inclusive, and (4) a condition that an average value of a linear expansion coefficient is 13×$10^{-5}$/° C. or higher when a static load is 0.4 N within a temperature range of +50° C. to +65° C., inclusive.

According to the configuration, in the outer cover material including the vacuum heat-insulating material, in any of the temperature-linear expansion coefficient conditions (1) to (4), an upper limit value of the linear expansion coefficient or a lower limit value of an average value is assumed in a predetermined static load in a "reference temperature range". Accordingly, in the reference temperature range and a periphery temperature range thereof, it is possible to excellently control a degree of expansion and contraction of the outer cover material. Therefore, in a use condition in which the low-temperature environment or the high-temperature difference environment is generated, it is also possible to realize at least one of excellent strength and durability of the outer cover material for a long period of time. As a result, in the vacuum heat-insulating material, it is possible to further optimize reliability of the outer cover material to make it possible to employ the vacuum heat-insulating material in an industrial product.

In addition, in the present invention, there is provided a heat-insulating container including: a heat-insulating structure body equipped with the vacuum heat-insulating material having the above-described configuration, in which a low-temperature substance is held.

Furthermore, in the present invention, there are provided a dwelling wall and a transport machine which are configured of the vacuum heat-insulating material having the above-described configuration.

Furthermore, in the present invention, there are also provided a hydrogen transport tanker or an LNG transport tanker which are provided with the heat-insulating container equipped with the vacuum heat-insulating material having the above-described configuration.

According to the present invention, in the vacuum heat-insulating material, it is possible to further optimize reliability of the outer cover material to make it possible to employ the vacuum heat-insulating material in the industrial product.

BRIEF DESCRIPTION OF DRAWINGS

FIG. 4A is a schematic view illustrating a schematic configuration of a membrane type LNG transport tanker including an inboard tank which is a heat-insulating container equipped with a vacuum heat-insulating material, according to a third exemplary embodiment of the present invention.

FIG. 4B is a schematic view illustrating a schematic configuration of the inboard tank which corresponds to an arrow section taken along line 4B-4B, in FIG. 4A.

DESCRIPTION OF EMBODIMENTS

Figure 1:
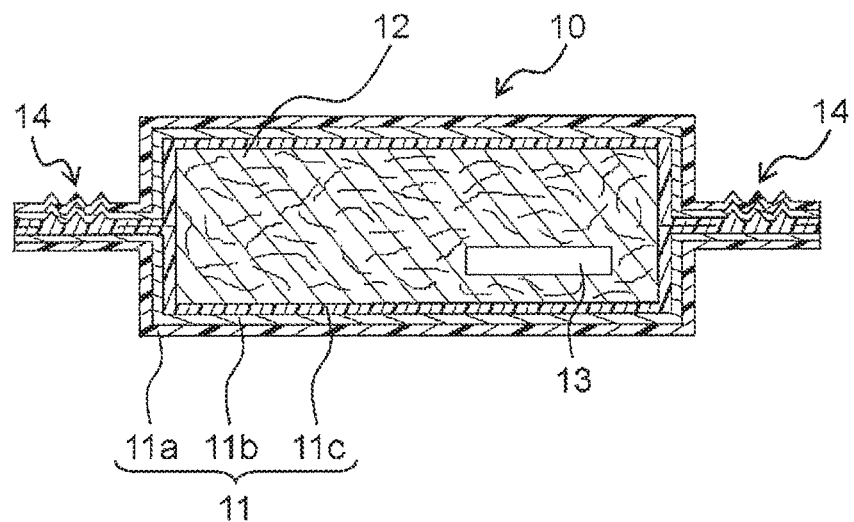
FIG. 1 is a sectional view schematically illustrating a representative configuration of a vacuum heat-insulating material according to a first exemplary embodiment of the present invention.

Hereinafter, preferable exemplary embodiments of the present invention will be described with reference to the drawings. In addition, in the following description, through all of the drawings, the same or corresponding elements will be given the same reference numerals, and overlapping description thereof will be omitted.

First Exemplary Embodiment

First, vacuum heat-insulating material 10 according to a first exemplary embodiment of the present invention will be described.

[Basic Configuration of Vacuum Heat-Insulating Material]

As illustrated in FIG. 1, vacuum heat-insulating material 10 according to the exemplary embodiment includes outer cover material 11 which is an outer package material and an inner member which is sealed in a tightly closed and decompressed state (substantially vacuum state) on the inside of outer cover material 11. The inner member is configured of a material which does not cause a chemical reaction which follows hydrogen when outer cover material 11 is ruptured (damaged or the like), water of liquid enters the inside, and outer cover material 11 comes into contact with the moisture. In vacuum heat-insulating material 10 according to the exemplary embodiment, core material 12 and adsorbent 13 are provided as the inner member.

Outer cover material 11 which is used in vacuum heat-insulating material 10 is not limited to a particular specific configuration, and various known materials can be appropriately used. In the disclosure, it is preferable that outer cover material 11 includes at least a resin component. As outer cover material 11 is configured of the resin component, it is possible to impart at least one of properties of flexibility and softness to outer cover material 11. According to the configuration, it is possible to fix (for example, attach) a front surface shape of a heat-insulating target by a shape that follows vacuum heat-insulating material 10, and to improve general-purpose properties of vacuum heat-insulating material 10.

A specific example of a configuration of outer cover material 11 includes a configuration which has gas barrier properties and uses a bag-like member. As illustrated in FIG. 1, the bag-like configuration can be realized by allowing two films to oppose each other and by sealing the periphery thereof, but is not particularly limited to the configuration. A location of which the periphery is sealed, that is, sealing portion 14 is in a state where core material 12 does not exist on the inside thereof and the films are in contact with each other, and is formed in a shape of a fin which extends toward an outer circumference from a main body of vacuum heat-insulating material 10.

A film material which configures outer cover material 11 is not particularly limited to a specific configuration. For example, as described above, the film material which is configured to include at least a resin component in a shape of a film (or a shape of a sheet) may be employed. A specific example includes a laminated film which includes a resin layer and has a multilayer structure. Regarding the laminated film, the disclosure is not particularly limited to a specific configuration, but for example, a configuration in which three layers including front surface protecting layer 11a, gas barrier layer 11b, and thermal welding layer 11c are laminated in this order can be employed.

Front surface protecting layer 11a is a resin layer for protecting an outer surface (front surface) of vacuum heat-insulating material 10, and for example, a known rein film, such as a nylon film, a polyethylene terephthalate film, or a polypropylene film can be used. However, the disclosure is not particularly limited to the configurations. Front surface protecting layer 11a may be configured of only one layer of the resin film, or may be configured as a plurality of resin films are laminated. For example, in Example 2 which will be described later, front surface protecting layer 11a is configured of two layers of nylon film/nylon film. In addition, a thickness of front surface protecting layer 11a in the disclosure is not particularly limited, but a thickness which is in a range that can protect a front surface of outer cover material 11 (and vacuum heat-insulating material 10) may be employed.

Gas barrier layer 11b is a layer for preventing the external air from entering the inside of vacuum heat-insulating material 10, and a known film having gas barrier properties can be appropriately used. Examples of a film having gas barrier properties include metal foil, such as aluminum foil, copper foil, stainless foil, a deposition film including a deposition layer on which metal or metal oxide is deposited with respect to a resin film that becomes a base, and a film which is obtained by further performing a known coating processing with respect to a front surface of the deposition film. However, the disclosure is not particularly limited to the examples.

Examples of the base which is used in the deposition film include a polyethylene terephthalate film and an ethylene-vinyl alcohol copolymer film, and examples of metal or metal oxide include aluminum, copper, alumina, and silica. However, the disclosure is not particularly limited to the examples.

In addition, gas barrier layer 11b may be configured of one layer including a film or foil, or may be configured as a plurality of films or foils are laminated. For example, in Example 2 which will be described later, gas barrier layer 11b is configured of four layers of a polyethylene terephthalate layer/metal deposition layer/metal deposition layer/ ethylene-vinyl alcohol copolymer layer. In addition, a thickness of gas barrier layer 11b of the disclosure is not particularly limited, and in accordance with a type of the metal foil or the deposition layer, gas barrier layer 11b may have a thickness which is in a range that can achieve gas barrier properties.

Thermal welding layer 11c is a layer for making the laminated films to oppose each other and for attaching the laminated films to each other, and also functions as a layer which protects the front surface of gas barrier layer 11b. In other words, one surface (an outer surface or a front surface) of gas barrier layer 11b is protected by front surface protecting layer 11a, and the other surface (an inner surface or a rear surface) is protected by thermal welding layer 11c. On the inside of vacuum heat-insulating material 10, core material 12 and adsorbent 13 are sealed, and thus, the influence on gas barrier layer 11b caused by the object on the inside thereof is prevented or suppressed by thermal welding layer 11c.

An example of thermal welding layer 11c includes a film which is made of a thermoplastic resin, such as low-density polyethylene, but is not particularly limited. In addition, the thickness of thermal welding layer 11c is also not particularly limited, and may be a thickness which is in a range to an extent that welding components, such as the thermoplastic resin, can sufficiently exist on the other surface of the laminated film, and which is in a range to an extent that the other surface of the laminated film can be protected.

In addition, the laminated film may be provided with a layer other than front surface protecting layer 11a, gas barrier layer 11b, and thermal welding layer 11c. In addition, as described above, front surface protecting layer 11a, gas barrier layer 11b, and thermal welding layer 11c may be respectively configured of one layer, or may be configured of a plurality of layers which are equal to or greater than two layers. Therefore, in the laminated film, a specific configuration thereof is not particularly limited as long as one of one pair of surfaces (front and rear surfaces) is thermal welding layer 11c, and when a condition that gas barrier layer 11b is provided in the multilayer structure (or any one layer in the multilayer structure has gas barrier properties) is satisfied.

Core material 12 is not particularly limited as long as core material 12 has heat-insulation. Specifically, a known material, such as a fiber material and a foaming material can be employed. For example, in the exemplary embodiment, as core material 12, an inorganic fiber is used. The inorganic fiber may be a fiber made of an inorganic material, and specific examples thereof can include a glass fiber, a ceramic fiber, a slag wool fiber, and a rock wool fiber.

In addition, core material 12 can be used by molding core material 12 in a shape of a plate (shape of a board). Specifically, for example, by laminating the fiber material in a shape of a flat plate, by loading the laminated body in a tool, by performing heating in a pressurized state by a pressurizing press or the like, and by performing molding to achieve density and thickness that are in a predetermined range, plate-like core material 12 can be obtained. A pressurization condition of the fiber material and a heating condition are not particularly limited, and a known condition can be appropriately used in a manufacturing field of vacuum heat-insulating material 10. In addition, in a case where plate-like core material 12 is molded, except for a transition material, a known binder material or powder may be used. A material thereof contributes to improving physical properties, such as strength, uniformity, and rigidity of core material 12.

After core material 12 is tightly sealed and decompressed on the inside of outer cover material 11, adsorbent 13 adsorbs and removes remaining gas (also including vapor) which is discharged from a fine void or the like of core material 12, and the external air (also including vapor) which slightly enters from sealing portion 14 or the like. A specific type of adsorbent 13 is not particularly limited, and a known material, such as zeolite, calcium oxide, or a silica gel, can be appropriately used. In addition, vacuum heat-insulating material 10 may be provided with members or the like other than outer cover material 11, core material 12, and adsorbent 13.

A specific manufacturing method of vacuum heat-insulating material 10 is not limited to a specific method, and a known manufacturing method can be appropriately used. In the exemplary embodiment, a manufacturing method of tightly closing and sealing bag-like outer cover material 11 under the decompressed environment (substantially vacuum state) by inserting core material 12 and adsorbent 13 into the inside thereof after configuring outer cover material 11 in a shape of a bag, is employed.

Figure 2:
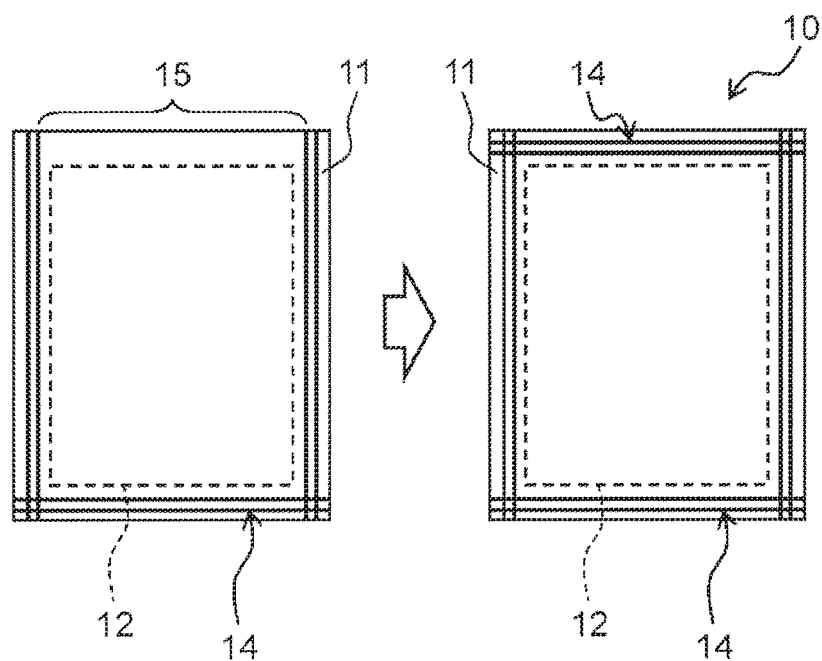
FIG. 2 is a schematic plan view of the vacuum heat-insulating material according to the first exemplary embodiment of the present invention.

In addition, a method of configuring outer cover material 11 in a shape of a bag is not limited to a specific method, but a method of configuring outer cover material 11 in a shape of a bag by preparing two laminated films that become outer cover material 11, and by thermally welding a large part of a circumferential edge portion in a state where each of the thermal welding layers 11c is disposed to oppose each other, is provided. Specifically, for example, as illustrated in FIG. 2, a part (upper part on a left side in FIG. 2) of the circumferential edge portion of outer cover material 11 remains as opening portion 15, and a remaining portion of the circumferential edge portion except for opening portion 15 may be thermally welded to include the center part (a part at which core material 12 is accommodated). In addition, the thermally welded circumferential edge portion configures sealing portion 14.

After this, core material 12 and adsorbent 13 may be inserted into outer cover material 11 from opening portion 15, and may be decompressed in decompression equipment, such as a decompression chamber. Accordingly, from opening portion 15, the inside (inside of the bag) of bag-like outer cover material 11 is sufficiently decompressed, and a substantially vacuum state is achieved. Furthermore, after this, similar to another circumferential edge portion, when opening portion 15 is tightly closed and sealed by the thermal welding (refer to a right side in FIG. 2), and vacuum heat-insulating material 10 in which the periphery of outer cover material 11 is sealing portion 14 can be obtained.

In addition, all of the conditions of the thermal welding and decompression are not particularly limited, and various known conditions can be appropriately employed. In addition, bag-like outer cover material 11 is not limited to a configuration in which two laminated films are used. For example, by folding one laminated film by half and by thermally welding both of side edge portions, it is also possible to obtain bag-like outer cover material 11 having opening portion 15. Otherwise, by molding the laminated film in a shape of a tube and by sealing one opening portion 15, bag-like outer cover material 11 can also be obtained.

[Conditions of Outer Cover Material]

In vacuum heat-insulating material 10 according to the disclosure, as described above, outer cover material 11 has gas barrier properties and satisfies at least any one of the conditions among (1) a condition that a linear expansion coefficient is $80 \times 10^{-5}/°$ C. or lower when a static load is 0.05 N within a temperature range of $-130°$ C. to $80°$ C., (2) a condition that an average value of a linear expansion coefficient is $65 \times 10^{-5}/°$ C. or higher when a static load is 0.4 N within a temperature range of $-140°$ C. to $-130°$ C., (3) a condition that an average value of a linear expansion coefficient is $20 \times 10^{-5}/°$ C. or higher when a static load is 0.4 N within a temperature range of $-140°$ C. to $-110°$ C., and (4) a condition that an average value of a linear expansion coefficient is $13 \times 10^{-5}/°$ C. or higher when a static load is 0.4 N within a temperature range of $+50°$ C. to $+65°$ C. In other words, outer cover material 11 is configured to satisfy any one of the above-described temperature-linear expansion coefficient conditions (1) to (4).

In other words, outer cover material 11 provided in vacuum heat-insulating material 10 satisfies a condition of an upper limit value of the linear expansion coefficient at a predetermined static load or a lower limit value of an average value which are regulated in a "reference temperature range" of a low-temperature region or a high-temperature region. Accordingly, in the reference temperature range of a low-temperature region and a high-temperature region and the periphery temperature range thereof, it is possible to excellently control a degree of expansion and contraction of outer cover material 11. Therefore, in a use condition in which the low-temperature environment or the high-temperature difference environment is generated, it is also possible to realize at least one of excellent strength and durability of outer cover material 11 for a long period of time.

In addition, a reference temperature range (first reference temperature range) in the temperature-linear expansion coefficient condition (1) is from $-130°$ C. to $80°$ C., and a reference temperature range (second reference temperature range) in the temperature-linear expansion coefficient condition (2) is from $-140°$ C. to $-130°$ C. In addition, a reference temperature range (third reference temperature range) in the temperature-linear expansion coefficient condition (3) is from $-140°$ C. to $-110°$ C., and a reference temperature range (fourth reference temperature range) in the temperature-linear expansion coefficient condition (4) is from $+50°$ C. to $+65°$ C. The reference temperature range will be described later.

In addition, a predetermined static load when measuring the linear expansion coefficient is 0.05 N in the temperature-linear expansion coefficient condition (1), and is 0.4 N in the temperature-linear expansion coefficient conditions (2) to (4). The static load depends on the type of the material, but generally, the upper limit value of the static load which is applied when measuring the linear expansion coefficient is approximately 0.05 N in a resin material. Therefore, in the temperature-linear expansion coefficient condition (1), the static load is set to be 0.05 N. In addition, in the temperature-linear expansion coefficient conditions (2) to (4), as will be described later, from the viewpoint of evaluating stress mitigation or expansion and contraction, it is desirable to apply 0.4 N as the static load.

Here, among the above-described temperature-linear expansion coefficient conditions (1) to (4), when at least any one condition is a "first condition" for convenience of description, outer cover material 11 may satisfy at least the first condition. Furthermore, as a "second condition", it is more preferable that the tensile strength at break at an atmosphere of $-130°$ C. satisfies a value which is equal to or greater than 180 MPa. As outer cover material 11 satisfies the first condition and the second condition, it is possible to further optimize mechanism strength under the low-temperature environment. As the second condition, the tensile strength at break may be equal to or greater than 180 MPa at an atmosphere of $-130°$ C., but further, a case where the tensile strength at break is equal to or greater than 190 MPa is more preferable.

In addition, in addition to the above-described first condition and the second condition, outer cover material 11 in which at least one of the linear expansion coefficients in the MD direction (the mechanical extending direction and the longitudinal direction) and in the TD direction (the width direction and the lateral direction) of the film-like outer cover material 11 satisfies $80 \times 10^{-5}/°$ C. or lower, as a "third condition", is more preferable. In other words, the third condition in outer cover material 11 is not limited to a condition, such as the direction or the like of outer cover material 11, and is a condition that the linear expansion coefficient is equal to or less than $80 \times 10^{-5}/°$ C. at least at any location. Accordingly, in a use condition in which the low-temperature environment or the high-temperature difference environment is generated, it is possible to realize at least one of excellent strength and durability of outer cover material 11 for a long period of time.

Here, in a case where the third condition of outer cover material 11 is satisfied, a ratio of the linear expansion coefficient in the MD direction and the linear expansion coefficient in the TD direction is not particularly limited. However, in a case where an average value (TD average linear expansion coefficient) of the linear expansion coefficient in the TD direction in the reference temperature range is Ctd and an average value (MD average linear expansion coefficient) of the linear expansion coefficient in the MD direction in the reference temperature range is Cmd, a ratio Cmd/Ctd of the MD average linear expansion coefficient with respect to the TD average linear expansion coefficient which is equal to or less than 3, is more preferable. Accordingly, in a use condition that the low-temperature environment or the high-temperature difference environment is generated, it is possible to realize at least one of more excellent strength and durability of outer cover material 11 for a long period of time. The above-described condition that Cmd/Ctd is equal to or less than a predetermined value is referred to as a "fourth condition" for convenience.

In the disclosure, a method for realizing the first to the fourth conditions in outer cover material 11 is not limited to a specific method. By adjusting various types of layers which configure outer cover material 11, a molding method or a molding condition of each layer and the laminated film on which the layers are laminated, and all of the conditions, such as a type or an addition amount of usable added components with respect to each layer, it is possible to appropriately realize each of the first to the fourth conditions. As described above, outer cover material 11 is configured as the laminated film, but can be configured as a single-layered film having only one layer. However, when outer cover material 11 is the laminated film, by adjusting all of the conditions regarding each layer that configures the laminated film, the above-described first to the fourth conditions can be easily set to be within a desirable range.

In the disclosure, as described above, it is preferable that the laminated film which configures outer cover material 11 is configured in three layers including front surface protecting layer 11a, gas barrier layer 11b, and thermal welding layer 11c, and at least any one of front surface protecting layer 11a, gas barrier layer 11b, and thermal welding layer 11c may be multilayered. In other words, the laminated film can be a multilayer structure including at least the resin layer (front surface protecting layer 11a and thermal welding layer 11c) and gas barrier layer 11b. Therefore, the laminated film which becomes outer cover material 11 is not limited to the three-layered configuration including front surface protecting layer 11a, gas barrier layer 11b, and thermal welding layer 11c.

In addition, as described above, gas barrier layer 11b may be configured to include at least one layer of the metal foil layer or the metal deposition layer. Therefore, the laminated film may be configured of only the deposition film in which the metal deposition layer is formed on the base layer. In this case, the deposition film can be a laminated film having two-layered configuration, and can also be practically a single-layered laminated film.

In vacuum heat-insulating material 10 according to the disclosure, as described above, outer cover material 11 satisfies the above-described first condition, that is, at least any one of the conditions among the temperature-linear expansion coefficient conditions (1) to (4). Therefore, vacuum heat-insulating material 10 according to the disclosure can be appropriately used for a purpose which assumes the use in the reference temperature range. As the purpose, for example, an LNG tanker which transports liquefied natural gas (LNG) that will be described later and is illustrated in a second exemplary embodiment or a third exemplary embodiment which will be described later, can be employed.

LNG is generally a low-temperature fluid of which the temperature is approximately $-162°$ C., and the LNG tank which holds the LNG on the inside thereof is provided with a heat-insulating structure body for suppressing the entering of the heat to the inside. As a period during which the LNG tanker transports the LNG, for example, approximately four weeks is employed, but during this period, the temperature of an outer surface of the heat-insulating structure body becomes approximately $-130°$ C. In addition, the LNG tanker after transporting the LNG does not become empty as the LNG is discharged from the inside of the LNG tank, and by remaining a part of the LNG, a change in temperature is suppressed. Therefore, when the LNG tanker is in service, the temperature of the outer surface of the heat-insulating structure body becomes a low temperature which is approximately $-130°$ C.

Meanwhile, the LNG tanker receives maintenance at a maintenance dock once every several years. At this time, there is a case where the LNG tank is exposed to a high temperature that exceeds the normal temperature, and for example, there is a possibility that the temperature of the outer surface of the heat-insulating structure body becomes approximately $+80°$ C. Therefore, it is necessary to assume that the heat-insulating structure body of the LNG tank is used by a temperature difference (temperature difference of Δ210° C.) of −130° C. to +80° C. When a large temperature difference which is Δ210° C. is generated in the heat-insulating structure body, large thermal stress which corresponds to the temperature difference is generated. In addition, the use of the ship, such as the LNG tanker, for a long period of time, for example, tens of years, can be assumed. Therefore, with respect to the heat-insulating structure body, it is possible to correspond to the large thermal stress, and the reliability is realized for a long period of time even when the thermal stress is generated.

Here, in vacuum heat-insulating material 10 according to the disclosure, as the first condition, the temperature-linear expansion coefficient condition (1), that is, a condition that the average value of the linear expansion coefficient when the static load is 0.05 N is equal to or less than $80 \times 10^{-5}/°$ C. within the first reference temperature range (within a temperature range from −130° C. to 80° C.) in outer cover material 11, is regulated. Accordingly, in the first reference temperature range and the periphery temperature range thereof, it is possible to excellently suppress a degree of expansion and contraction of outer cover material 11.

In addition, as a result of keen investigation of the inventors, in outer cover material 11, it is apparent that a stress mitigation action is generated in loss modulus in the low-temperature region. In particular, within a temperature range of −140° C. to −130° C., excellent expansion and contraction properties are required to be exhibited in outer cover material 11 so that excellent stress mitigation action is generated. Therefore, in the temperature range, outer cover material 11 having a higher linear expansion coefficient is desirable.

Here, in vacuum heat-insulating material 10 according to the disclosure, as the temperature linear expansion coefficient condition, the temperature-linear expansion coefficient condition (2), that is, a condition that the average value of the linear expansion coefficient when the static load is 0.4 N is equal to or greater than $65 \times 10^{-5}/°$ C. within the second reference temperature range (within a temperature range from −140° C. to −130° C.) in outer cover material 11, is regulated. Accordingly, in the second reference temperature range and the periphery temperature range thereof, it is possible to excellently control expansion and contraction properties of outer cover material 11.

In addition, as a result of keen investigation of the inventors, in the low-temperature region, all of the materials which configure outer cover material 11 are in a glass state, and thus, it is apparent that outer cover material 11 is likely to be embrittled. In particular, in a temperature range of −140° C. to −110° C. it is considered that the influence of the embrittlement due to the glass state is large, and thus, excellent expansion and contraction properties are required to be exhibited in outer cover material 11 so that the embrittlement is mitigated. Therefore, in the temperature range, outer cover material 11 having a higher linear expansion coefficient is desirable.

Here, in vacuum heat-insulating material 10 according to the disclosure, as the temperature linear expansion coefficient condition, the temperature-linear expansion coefficient condition (3), that is, a condition that the average value of the linear expansion coefficient when the static load is 0.4 N is equal to or greater than $20 \times 10^{-5}/°$ C. within the third reference temperature range (within a temperature range from −140° C. to −110° C.) in outer cover material 11, is regulated. Accordingly, in the third reference temperature range and the periphery temperature range thereof, it is possible to excellently control expansion and contraction properties of outer cover material 11.

In addition, any of the temperature-linear expansion coefficient conditions (1) to (3) is a temperature linear expansion coefficient condition in low-temperature region, but, in the conditions, as described above, a part of the reference temperature range overlaps. Therefore, in vacuum heat-insulating material 10 according to the disclosure, as the temperature-linear expansion coefficient condition in the low-temperature region of outer cover material 11, any of the above-described temperature-linear expansion coefficient conditions (1) to (3) may be satisfied. It is needless to say that all of the temperature-linear expansion coefficient conditions (1) to (3) may be satisfied.

Furthermore, as described above, when the maintenance of the LNG tanker is performed, there is a possibility that the temperature of the LNG tank becomes approximately +80° C. Here, when the maintenance is performed, there is a case where high-temperature vapor is blown to the LNG tank. As the vapor is blown, rapid deformation or stress can be generated to outer cover material 11. As a temperature range influenced by the deformation or the generation of stress, as a result of keen investigation of the inventors, a range of +50° C. to +65° C. is found out. Within the temperature range, in order to mitigate the deformation or the stress, the excellent expansion and contraction properties are required to be exhibited in outer cover material 11. Therefore, in the temperature range, outer cover material 11 having a higher linear expansion coefficient is desirable.

Here, in vacuum heat-insulating material 10 according to the disclosure, as the first condition, the temperature-linear expansion coefficient condition (4), that is, a condition that the average value of the linear expansion coefficient when the static load is 0.4 N is equal to or greater than $13 \times 10^{-5}/°$ C. within the fourth reference temperature range (within a temperature range of +50° C. to +65° C.) in outer cover material 11, is regulated. Accordingly, in the fourth reference temperature range and the periphery temperature range thereof, it is possible to excellently control expansion and contraction properties of outer cover material 11.

In addition, in vacuum heat-insulating material 10 according to the disclosure, when the temperature-linear expansion coefficient condition (4) which is the first condition of the high-temperature region is satisfied, the above-described temperature-linear expansion coefficient conditions (1) to (3) which are the first condition of the low-temperature region may not be necessarily satisfied. It is needless to say that both of at least any one of the conditions among the temperature-linear expansion coefficient conditions (1) to (3) of the low-temperature region, and the temperature-linear expansion coefficient condition (4) of the high-temperature region may be satisfied. Furthermore, preferably, all of the temperature-linear expansion coefficient conditions (1) to (4) may be satisfied.

Furthermore, among the above-described temperature-linear expansion coefficient conditions (1) to (4), particularly, in the temperature-linear expansion coefficient conditions (2) to (4), from the viewpoint of controlling the expansion and contraction properties of outer cover material 11 to be more excellent, a more preferable lower limit value is regulated.

Specifically, in the above-described temperature-linear expansion coefficient condition (2), within the second reference temperature range, the average value of the linear expansion coefficient when the static load is 0.4 N may be equal to or greater than $65 \times 10^{-5}/°$ C. as described above, but is preferably equal to or greater than $80 \times 10^{-5}/°$ C., and is more preferably equal to or greater than $110\times10^{-5}/°$ C. In addition, in the above-described temperature-linear expansion coefficient condition (3), within the third reference temperature range, the average value of the linear expansion coefficient when the static load is 0.4 N may be equal to or greater than $20\times10^{-5}/°$ C. as described above, but is preferably equal to or greater than $25\times10^{-5}/°$ C., and is more preferably equal to or greater than $40\times10^{-5}/°$ C. Furthermore, in the above-described temperature-linear expansion coefficient condition (4), within the fourth reference temperature range, the average value of the linear expansion coefficient when the static load is 0.4 N may be equal to or greater than $13\times10^{-5}/°$ C. as described above, but is preferably equal to or greater than $15\times10^{-5}/°$ C., and is more preferably equal to or greater than $19\times10^{-5}/°$ C.

In this manner, as the first condition of outer cover material 11, when at least any one among the above-described temperature-linear expansion coefficient conditions (1) to (4) is satisfied, in the reference temperature range and the periphery temperature range thereof, it is possible to excellently control the degree of expansion and contraction of outer cover material 11. Therefore, even in a use condition that the low-temperature environment or the high-temperature difference environment is generated, for a long period of time, it is possible to realize at least one of excellent strength and durability of outer cover material 11. As a result, in vacuum heat-insulating material 10, it is possible to further optimize the reliability of outer cover material 11 to make it possible to employ vacuum heat-insulating material 10 in the industrial product.

In addition, in the disclosure, by confirming whether or not the outer cover material provided in the vacuum heat-insulating material satisfies at least any one of the temperature-linear expansion coefficient conditions (1) to (3) described above, evaluation of determining whether or not the heat-insulating performance set in advance is ensured in the vacuum heat-insulating material may be performed.

For example, when the above-described temperature-linear expansion coefficient condition (1) is employed, according to the disclosure, in the whole first reference temperature range, when the temperature region in which the linear expansion coefficient of the outer cover material exceeds $80\times10^{-5}/°$ C. exists, the degree of the expansion and contraction of the outer cover material increases in the reference temperature range and the periphery temperature range thereof, and as a result, it is apparent that the substantially vacuum state (tightly closed and decompressed state) on the inside of the vacuum heat-insulating material cannot be efficiently maintained, and there is a concern that the heat-insulating performance of the vacuum heat-insulating material deteriorates. Based on this finding, within the temperature range including the reference temperature range, by measuring the linear expansion coefficient of the outer cover material, it is possible to evaluate the heat-insulating performance of the vacuum heat-insulating material. Accordingly, with respect to a part of a configuration member in the vacuum heat-insulating material, only by measuring the physical properties value, it is possible to simply evaluate the heat-insulating performance of the vacuum heat-insulating material.

Therefore, in the disclosure, an evaluating method of the vacuum heat-insulating material which is used in at least any one of the low-temperature environment in which the temperature is lower than the normal temperature and the high-temperature environment in which the temperature is higher than the normal temperature, is included. Specifically, an evaluating method of the vacuum heat-insulating material of measuring the linear expansion coefficient while changing the temperature within the temperature range including the reference temperature range, and of determining whether or not the heat-insulating performance set in advance of the vacuum heat-insulating material is ensured by at least any one of the low-temperature environment and the high-temperature environment when the linear expansion coefficient is equal to or greater than a predetermined value based on a predetermined static load in the entire reference temperature range, the linear expansion coefficient is equal to or greater than the predetermined value or when the average value is equal to or greater than the predetermined value, with respect to the outer cover material provided in the vacuum heat-insulating material of the evaluation target, is also included.

Second Exemplary Embodiment

Next, a second exemplary embodiment of the present invention will be described.

In the above-described first exemplary embodiment, a basic configuration example of vacuum heat-insulating material 10 according to the disclosure will be described, but in the second exemplary embodiment, as a specific example of the heat-insulating container equipped with vacuum heat-insulating material 10 according to the disclosure, LNG spherical tank 101 which is provided in LNG transport tanker 100A illustrated in FIG. 3A will be described.

Figure 3A:
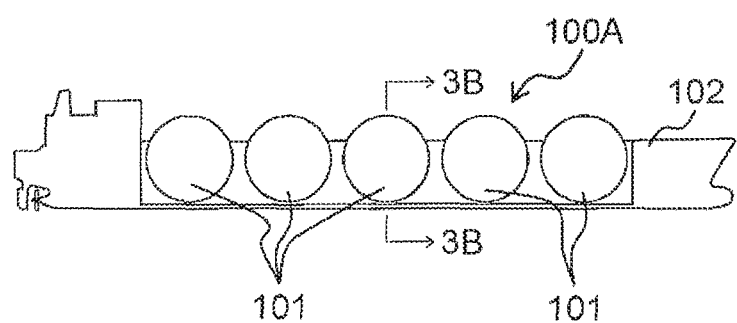
FIG. 3A is a schematic view illustrating a schematic configuration of a spherical independent tank type LNG transport tanker including a spherical tank which is a heat-insulating container equipped with a vacuum heat-insulating material, according to a second exemplary embodiment of the present invention.
Figure 3B:
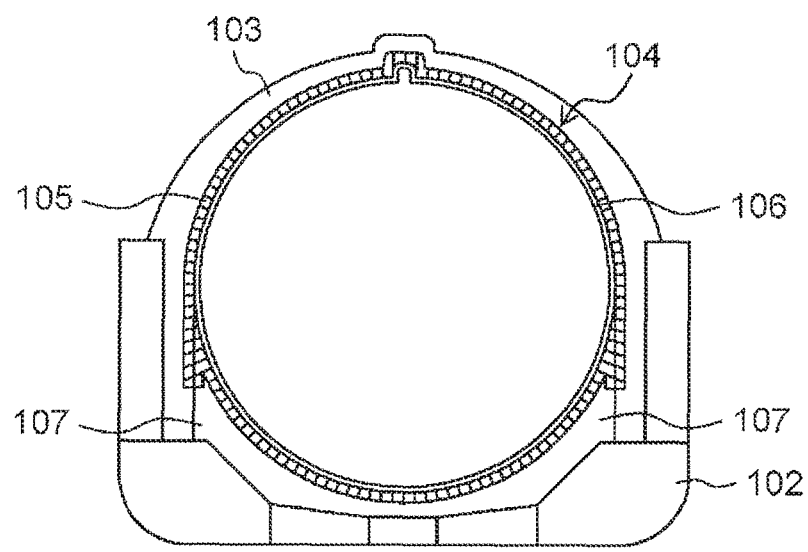
FIG. 3B is a schematic view illustrating a schematic configuration of the spherical tank that corresponds to an arrow section taken along line 3B-3B in FIG. 3A.

As illustrated in FIG. 3A, LNG transport tanker 100A in the exemplary embodiment is a spherical independent tank type tanker and is provided with the plurality (five in total in FIG. 3A) of spherical tanks 101. The plurality of spherical tanks 101 are arranged in one row along the longitudinal direction of ship body 102. As illustrated in FIG. 3B, each of spherical tanks 101 is provided with container main body 104. The inside of container main body 104 becomes an inner space (which is a substance holding space, and a fluid holding space in a case where the substance is a fluid) which stores (or holds) the LNG. In addition, a large part of spherical tank 101 is supported on the outside by ship body 102, and an upper part thereof is covered with cover 103.

As illustrated in FIG. 3B, container main body 104 includes container housing 106 and heat-insulating structure body 105 which heat-insulates an outer side surface of container housing 106. Container housing 106 is configured to be capable of holding the low-temperature substance preserved at a temperature which is lower than the normal temperature similar to the LNG, and is made of metal, such as stainless steel or aluminum alloy. Since the temperature of the LNG is generally −162° C., a specific example of container housing 106 includes a container housing made of aluminum alloy having a thickness of approximately 50 mm. Otherwise, container housing 106 may be made of stainless steel having a thickness of approximately 5 mm.

Heat-insulating structure body 105 may have a configuration in which vacuum heat-insulating material 10 described in the above-described first exemplary embodiment is provided. A representative configuration example of heat-insulating structure body 105 includes a multilayer structure body in which the plurality of heat-insulating layers are disposed on the outside of container housing 106. The above-described vacuum heat-insulating material 10 may be used on at least one layer among the plurality of heat-insulating layers. In the exemplary embodiment, vacuum heat-insulating material 10 is configured as a "heat-insulating panel" attached to other heat-insulating materials, but the configurations of heat-insulating structure body 105 equipped with vacuum heat-insulating material 10 and the heat-insulating container are not limited thereto. In a case where the heat-insulating layer is configured of the squared heat-insulating panel, the squared heat-insulating panel is disposed and fixed to the outside of container housing 106 by a unit of several thousands.

Container main body 104 is fixed to ship body 102 by support body 107. Support body 107 is generally referred to as a skirt, and has a thermal brake structure. The thermal brake structure is, for example, a structure in which stainless steel having low thermal conductivity is inserted between the aluminum alloy and the low-temperature steel material, and accordingly, it is possible to reduce the entering heat.

In this manner, in the exemplary embodiment, spherical tank 101 is disclosed as a heat-insulating container, spherical tank 101 includes heat-insulating structure body 105, and vacuum heat-insulating material 10 described in the first exemplary embodiment is employed with respect to heat-insulating structure body 105. Accordingly, under the environment where the heat-insulating container is exposed to the low-temperature environment by holding the low-temperature substance of which the temperature is equal to or less than −40° C., such as the LNG, and is exposed to the high-temperature environment when the maintenance is performed, that is, when the heat-insulating container is used within a wide range of temperature, such as the reference temperature range, it is also possible to excellently suppress the degree of expansion and contraction of outer cover material 11. Therefore, even in a case of the use condition that the low-temperature environment or the high-temperature difference environment is generated, for a long period of time, it is possible to realize at least one of excellent strength and durability of outer cover material 11. As a result, in vacuum heat-insulating material 10, it is possible to further optimize the reliability of outer cover material 11 to make it possible to employ vacuum heat-insulating material 10 in the industrial product.

Third Exemplary Embodiment

Next, a third exemplary embodiment will be described.

In the second exemplary embodiment, as a representative example of the heat-insulating container provided with vacuum heat-insulating material 10 according to the disclosure, spherical tank 101 provided in LNG transport tanker 100A as illustrated in FIGS. 3A and 3B is illustrated as an example, but the present invention is not limited thereto.

In the third exemplary embodiment, as the heat-insulating container provided with vacuum heat-insulating material 10 according to the disclosure, as illustrated in FIGS. 4A and 4B, LNG inboard tank 110 provided with membrane type LNG transport tanker 100B will be described as an example.

As illustrated in FIG. 4A, LNG transport tanker 100B in the exemplary embodiment is a membrane type tanker, and is provided with the plurality of inboard tanks 110 (four in total in FIG. 4A). The plurality of inboard tanks 110 are arranged in one row along the longitudinal direction of ship body 111. As illustrated in FIG. 4B, the inside of each of inboard tanks 110 becomes an inner space (substance holding space) which stores (holds) the LNG. In addition, a large part of inboard tank 110 is supported from the outside by ship body 111, and an upper part thereof is sealed with deck 112.

On an inner surface of inboard tank 110, as illustrated in FIG. 4B, primary membrane 113, primary heat-insulating box 114, secondary membrane 115, and secondary heat-insulating box 116 are laminated in this order from the inside to the outside. Accordingly, on the inner surface of inboard tank 110, a double "heat-insulating vessel structure" (or a heat-preventing structure) is formed. The "heat-insulating vessel structure" referred here indicates a structure configured of a layer (heat-insulating layer) of the heat-insulating material (heat-preventing material) and a membrane made of metal. The inner "heat-insulating vessel structure" (primary heat-preventing structure) is configured of primary membrane 113 and primary heat-insulating box 114, and the outer "heat-insulating vessel structure" (secondary heat-preventing structure) is configured of secondary membrane 115 and secondary heat-insulating box 116.

The heat-insulating layer prevents (or suppresses) the heat from entering into the inner space from the outside of inboard tank 110, and in the exemplary embodiment, primary heat-insulating box 114 and secondary heat-insulating box 116 are used. In other words, in the exemplary embodiment, primary heat-insulating box 114 and secondary heat-insulating box 116 function as the heat-insulating structure bodies. Primary heat-insulating box 114 and secondary heat-insulating box 116 may be configured to accommodate the heat-insulating material on the inside of the heat-insulating box, and a specific configuration thereof is not particularly limited. In the exemplary embodiment, for example, primary heat-insulating box 114 and secondary heat-insulating box 116 can be respectively configured as a configuration in which the plurality of heat-insulating boxes in which the heat-insulating materials are accommodated are integrally configured (integrated heat-insulating box).

In each of primary heat-insulating box 114 and secondary heat-insulating box 116, for example, a powder heat-insulating material is accommodated. As the powder heat-insulating material, for example, pearlite which is an inorganic foaming material is employed, but the type of the powder heat-insulating material is not limited to the pearlite. For example, the powder heat-insulating material may be a heat-insulating material made of a foaming resin material, such as styrene foam, polyurethane foam, or phenol foam, may not be a foaming material and may be an inorganic fiber, such as grass wool, or may be a known heat-insulating material other than the materials. In membrane type LNG transport tanker 100B, generally, a foaming body, such as pearlite, is used as the powder heat-insulating material.

In addition, on a bottom surface of secondary heat-insulating box 116, vacuum heat-insulating material 10 which is not illustrated in FIG. 4B and is described in the first exemplary embodiment, is provided. Vacuum heat-insulating material 10 is a heat-insulating material (heat-insulating material having excellent heat-insulating performance) having lower thermal conductivity $\lambda$ than that of the powder heat-insulating material. Therefore, by providing vacuum heat-insulating material 10 on the outside of secondary heat-insulating box 116 positioned on the outside as the heat-insulating layer, it is possible to suppress or prevent heat movement from the outside, and to suppress or prevent leakage of the cold air on the inside to the outside.

The powder heat-insulating material accommodated in secondary heat-insulating box 116 is not maintained in a state of a shape of powder, and can be a heat-insulating panel formed in a shape of a panel. In this configuration, it is possible to attach vacuum heat-insulating material 10 to the outer surface of the heat-insulating panel of the powder heat-insulating material. Accordingly, as secondary heat-insulating box 116, it is possible to use vacuum heat-insulating material 10 described in the first exemplary embodiment. Therefore, in the exemplary embodiment, secondary heat-insulating box 116 among primary heat-insulating box 114 and secondary heat-insulating box 116 which configure the heat-insulating structure body is provided with the above-described vacuum heat-insulating material 10.

The membrane functions as "vessel" for holding the LNG not to leak from the inner space, and is used to cover the upper part (inner side) of the heat-insulating material. In the exemplary embodiment, primary membrane 113 which covers the upper part (inner side) of primary heat-insulating box 114 and secondary membrane 115 which covers the upper part (inner side) of secondary heat-insulating box 116 are used. Primary membrane 113 configures an inner vessel of the heat-insulating container, secondary membrane 115 configures an intermediate vessel of the heat-insulating container, and ship body 111 configures an outer vessel of the heat-insulating container. In the disclosure, specific configurations of primary membrane 113 and secondary membrane 115 are not particularly limited, but representatively, a metal film, such as stainless steel or invar (nickel steel containing 36% of nickel), is employed.

In addition, any of primary membrane 113 and secondary membrane 115 is a member which does not make the LNG leak, but does not have strength as much as a structure that serves as inboard tank 110 is maintained. The structure of inboard tank 110 is supported by ship body 111 (and deck 112). In other words, the leakage of the LNG from inboard tank 110 is prevented by primary membrane 113 and secondary membrane 115, and the load of the LNG is supported by ship body 111 via primary heat-insulating box 114 and secondary heat-insulating box 116. Therefore, in a case where inboard tank 110 is viewed as the heat-insulating container, and ship body 111 is an external vessel and configures the "container housing".

In this manner, in the exemplary embodiment, inboard tank 110 is provided as the heat-insulating container, inboard tank 110 is provided with the heat-insulating structure body configured of primary heat-insulating box 114 and secondary heat-insulating box 116, and in secondary heat-insulating box 116 among the heat-insulating structure bodies, vacuum heat-insulating material 10 described in the first exemplary embodiment is employed. By this configuration, under the environment where the heat-insulating container is exposed to the low-temperature environment by holding the low-temperature substance of which the temperature is equal to or less than −40° C., such as the LNG, and is exposed to the high-temperature environment when the maintenance is performed, that is, when the heat-insulating container is used within a wide range of temperature, such as the reference temperature range, it is also possible to excellently suppress the degree of expansion and contraction of outer cover material 11. Therefore, even in a case of the use condition that the low-temperature environment or the high-temperature difference environment is generated, for a long period of time, it is possible to realize at least one of excellent strength and durability of outer cover material 11. As a result, in vacuum heat-insulating material 10, it is possible to further optimize the reliability of outer cover material 11 to make it possible to employ vacuum heat-insulating material 10 in the industrial product.

Fourth Exemplary Embodiment

Next, a fourth exemplary embodiment will be described.

The heat-insulating containers according to the second exemplary embodiment and the third exemplary embodiment are respectively spherical tank 101 provided in LNG transport tanker 100A, and inboard tank 110 provided in membrane type LNG transport tanker 100B. However, the disclosure is not limited thereto, and the heat-insulating container may be, for example, an LNG tank installed on the ground. In the fourth exemplary embodiment, the LNG tank will be described with reference to FIGS. 5 and 6.

Figure 5:
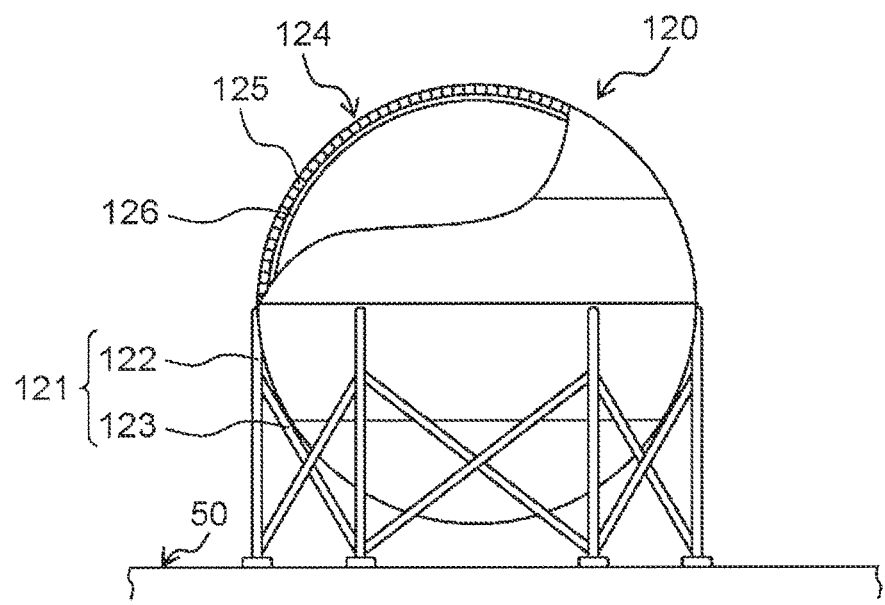
FIG. 5 is a schematic partial sectional view illustrating a representative configuration of a ground type LNG tank which is a heat-insulating container equipped with a vacuum heat-insulating material, according to a fourth exemplary embodiment of the present invention.

In FIG. 5, ground type LNG tank 120 is illustrated. Ground type LNG tank 120 is provided with spherical container main body 124 as a tank main body similar to spherical tank 101 of the above-described second exemplary embodiment, and container main body 124 is supported on ground surface 50 by support structure portion 121. Support structure portion 121 is configured of a plurality of props 122 provided in the perpendicular direction on ground surface 50, and brace 123 provided between props 122, but is not particularly limited to this configuration.

Container main body 124 is provided with container housing 126 which holds the low-temperature substance, and heat-insulating structure body 125 provided on the outside of container housing 126. Specific configurations of container housing 126 and heat-insulating structure body 125 are as described in the second exemplary embodiment and the third exemplary embodiment, and in heat-insulating structure body 125, vacuum heat-insulating material 10 described in the first exemplary embodiment is used.

Figure 6:
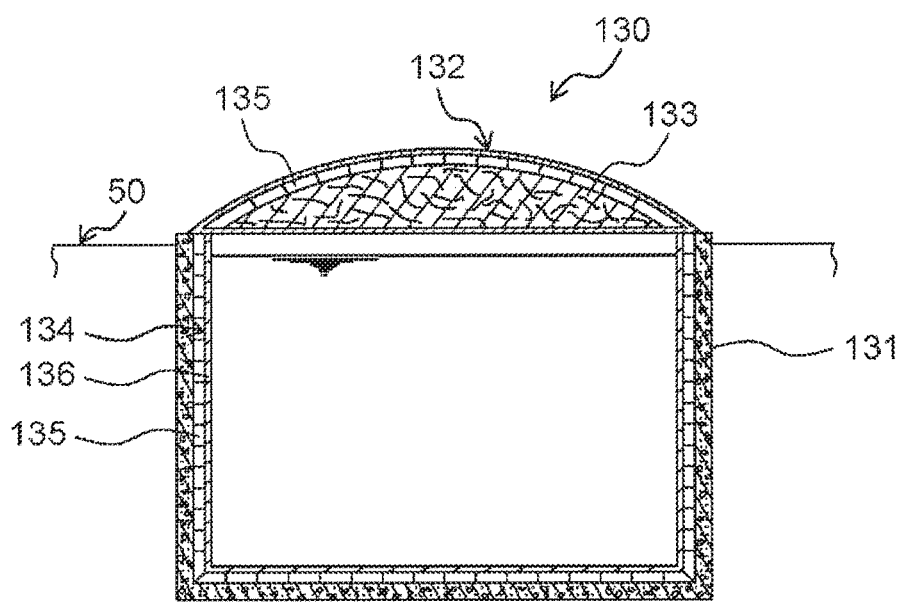
FIG. 6 is a schematic sectional view illustrating a representative configuration of an underground type LNG tank which is the heat-insulating container equipped with the vacuum heat-insulating material, according to the fourth exemplary embodiment of the present invention.

In FIG. 6, underground type LNG tank 130 is illustrated. Underground type LNG tank 130 is provided with cylindrical container main body 134 on the inside of concrete structure body 131 buried on ground surface 50. Container main body 134 is provided with container housing 136 which holds the low-temperature substance, and heat-insulating structure body 135 provided on the outside of container housing 136. Concrete structure body 131 is configured of, for example, prestressed concrete, and a large part thereof is installed under the ground to be below ground surface 50. Concrete structure body 131 is a support body which supports a structure of the tank main body of underground type LNG tank 130, and if by any chance the tank main body is damaged, concrete structure body 131 functions as a barrier which prevents the leakage of the LNG.

In addition, at an upper opening of container main body 134, roof portion 132 which is separated from container main body 134 is provided. An upper surface of roof portion 132 is a projected curved surface, and a lower surface is a flat surface. On the outside of roof portion 132, similar to container main body 134, heat-insulating structure body 135 is provided, and on the inside thereof, fibrous heat-insulating material 133 is provided. As fibrous heat-insulating material 133, for example, an inorganic fiber used as core material 12 of vacuum heat-insulating material 10 can be employed. Specific configurations of container housing 136 and heat-insulating structure body 135 are as described in the second exemplary embodiment or the third exemplary embodiment, and in heat-insulating structure body 135, vacuum heat-insulating material 10 described in the first exemplary embodiment is used.

In this manner, in the exemplary embodiment, the heat-insulating container is ground type LNG tank 120 or underground type LNG tank 130, ground type LNG tank 120 and underground type LNG tank 130 are respectively provided with heat-insulating structure bodies 125 and 135, and regarding heat-insulating structure bodies 125 and 135, vacuum heat-insulating material 10 described in the first exemplary embodiment is employed. By this configuration, under the environment where the heat-insulating container is exposed to the low-temperature environment by holding the low-temperature substance of which the temperature is equal to or less than −40° C., such as the LNG, and is exposed to the high-temperature environment when the maintenance is performed, that is, when the heat-insulating container is used within a wide range of temperature, such as the reference temperature range, it is also possible to excellently suppress the degree of expansion and contraction of outer cover material 11. Therefore, even in a case of the use condition that the low-temperature environment or the high-temperature difference environment is generated, for a long period of time, it is possible to realize at least one of excellent strength and durability of outer cover material 11. As a result, in vacuum heat-insulating material 10, it is possible to further optimize the reliability of outer cover material 11 to make it possible to employ vacuum heat-insulating material 10 in the industrial product.

Fifth Exemplary Embodiment

Next, a fifth exemplary embodiment will be described.

In any of the second exemplary embodiment to the fourth exemplary embodiment, the low-temperature substance held on the inside of the heat-insulating container is the LNG, but the disclosure is not limited thereto, and the use of vacuum heat-insulating material 10 within a temperature range including a reference temperature range from −130° C. to 80° C. may be assumed. In other words, the heat-insulating container may hold a substance having a lower temperature than that of the LNG. In the fifth exemplary embodiment, as such a substance having a lower temperature, hydrogen gas is illustrated as an example. A specific example of a hydrogen tank which liquefies and holds the hydrogen gas will be described with reference to FIG. 7.

Figure 7:
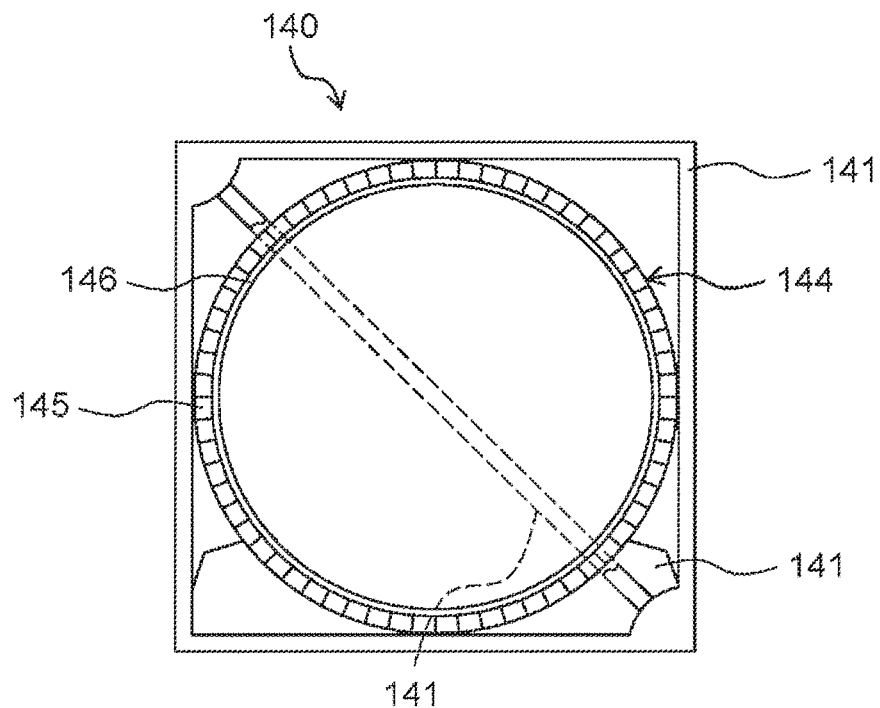
FIG. 7 is a schematic sectional view illustrating a representative configuration of a hydrogen tank which is a heat-insulating container equipped with a vacuum heat-insulating material, according to a fifth exemplary embodiment of the present invention.

As illustrated in FIG. 7, hydrogen tank 140 according to the exemplary embodiment is a container type, and basically, has a configuration which is similar to that of spherical tank 101 described in the second exemplary embodiment or ground type LNG tank 120 described in the fourth exemplary embodiment. In other words, hydrogen tank 140 is provided with container main body 144 which is a tank main body in frame-like support body 141, and container main body 144 is provided with container housing 146 which holds the low-temperature substance and heat-insulating structure body 145 provided on the outside of the container housing 146. Specific configurations of container housing 146 and heat-insulating structure body 145 are as described in the second exemplary embodiment to the fourth exemplary embodiment, and in heat-insulating structure body 145, vacuum heat-insulating material 10 described in the first exemplary embodiment is used.

In general, liquefied hydrogen (liquid hydrogen) is liquid having an extremely low temperature which is −253° C., and compared to the LNG, the ease of evaporation is approximately 10 times. Accordingly, regarding the liquefied hydrogen, it is necessary to further improve the heat-insulating performance (the size of thermal conductivity) of the heat-insulating material in order to obtain an evaporation loss level which is similar to the LNG. Meanwhile, in the exemplary embodiments, similar to the configurations described in the second exemplary embodiment to the fourth exemplary embodiment, heat-insulating structure body 145 provided with vacuum heat-insulating material 10 which can also correspond to a wide range of temperature is used. Accordingly, regarding hydrogen tank 140, it is possible to achieve higher heat-insulation, and to further optimize the reliability of the heat-insulating performance.

In a case where hydrogen tank 140 is a container type, a case of being put in a place exposed to wind and rain, or a case of being transported under the environment exposed to wind and rain, is assumed. In addition, transporting means is not limited to ground transportation means, such as a truck or a railroad, and marine transportation means, such as a ship, is also assumed. In other words, hydrogen tank 140 is used not only under the environment exposed to the wind and rain but also under the environment exposed to sea water.

In addition, in the disclosure, the low-temperature substance held on the inside of the heat-insulating container is not limited to the LNG or the liquefied hydrogen, and may be a substance (preferably, liquid having fluidity at a temperature which is lower than the normal temperature by 100° C. or more) preserved at a temperature which is lower than the normal temperature. An example of the liquid includes liquefied petroleum gas (LPG), other carbon hydrogen gas, and combustible gas including the LPG and the other carbon hydrogen gas, as liquid other than the LNG and the hydrogen gas. In addition, as various compounds transported by a chemical tanker or the like, compounds preserved at a temperature that is lower than the normal temperature may be employed.

In this manner, in the disclosure, the low-temperature substance is not particularly limited, various substances can be selected, and thus, the low-temperature substance is not limited to the liquid, such as liquid or gas, and may be solid. Therefore, in a case where the disclosure is employed in the ship, similar to LNG transport tankers 100A and 100B illustrated as an example in the second exemplary embodiment or the third exemplary embodiment, the disclosure is not limited to the ship which transports the LNG as the low-temperature substance. For example, the disclosure can also be employed in the ship, such as a chemical tanker which transports various compounds as the low-temperature substance, and a hydrogen transport tanker which transports the liquefied hydrogen as the low-temperature substance.

Here, LNG transport tankers 100A and 100B in the second exemplary embodiment or the third exemplary embodiment, are transport machines which transport the LNG. In addition, hydrogen tank 140 of the exemplary embodiment is a container for transporting the hydrogen. In addition, ground type LNG tank 120 and underground type LNG tank 130 of the fourth exemplary embodiment are for storing the LNG in the middle of delivery to a final consumer. In this manner, this is used in any distribution process. However, the heat-insulating container which can be employed in the disclosure is not limited to a container used in the distribution process illustrated as an example in the second exemplary embodiment to the fourth exemplary embodiment, and in the exemplary embodiment. For example, the heat-insulating container may be a container to be used by the final consumer. As such a container, a container or the like which preserves the low-temperature substance for medical, industrial, academic use, or the like can be employed. In addition, the "normal temperature" in the disclosure may be within a range (within a range of 15° C. to 25° C.) of 20° C.±5° C.

In this manner, in the exemplary embodiment, the heat-insulating container is hydrogen tank 140, hydrogen tank 140 is provided with heat-insulating structure body 145, and in heat-insulating structure body 145, vacuum heat-insulating material 10 described in the first exemplary embodiment is employed. Accordingly, when the heat-insulating container is exposed to the low-temperature from the low-temperature substance that is equal to or less than −100° C., such as the liquefied hydrogen, and is exposed to the high-temperature environment when the maintenance is performed, it is also possible to excellently suppress the degree of expansion and contraction of outer cover material 11. Therefore, even in a case of the use condition that the low-temperature environment or the high-temperature difference environment is generated, for a long period of time, it is possible to realize at least one of excellent strength and durability of outer cover material 11. As a result, in vacuum heat-insulating material 10, it is possible to further optimize the reliability of outer cover material 11 to make it possible to employ vacuum heat-insulating material 10 in the industrial product.

In addition, in any of the second exemplary embodiment to the fifth exemplary embodiment, the heat-insulating container which holds the low-temperature substance, such as the LNG or the liquid hydrogen, is illustrated as an example, and vacuum heat-insulating material 10 according to the disclosure and the heat-insulating container equipped therewith are described. However, the disclosure is employed not only in the heat-insulating container which holds the low-temperature substance, and but also can be widely and appropriately employed for the various uses of at least the heat-insulating structure used under the environment that enters the reference temperature range.

Sixth Exemplary Embodiment

Next, a sixth exemplary embodiment will be described.

In the second exemplary embodiment to the fifth exemplary embodiment, as an application example of vacuum heat-insulating material 10 according to the disclosure, the heat-insulating container is illustrated as an example. However, the present invention is not limited thereto, and can be widely and appropriately employed in various fields for heat-insulation. For example, in the sixth exemplary embodiment, dwelling wall 20 will be described as an example.

Figure 8:
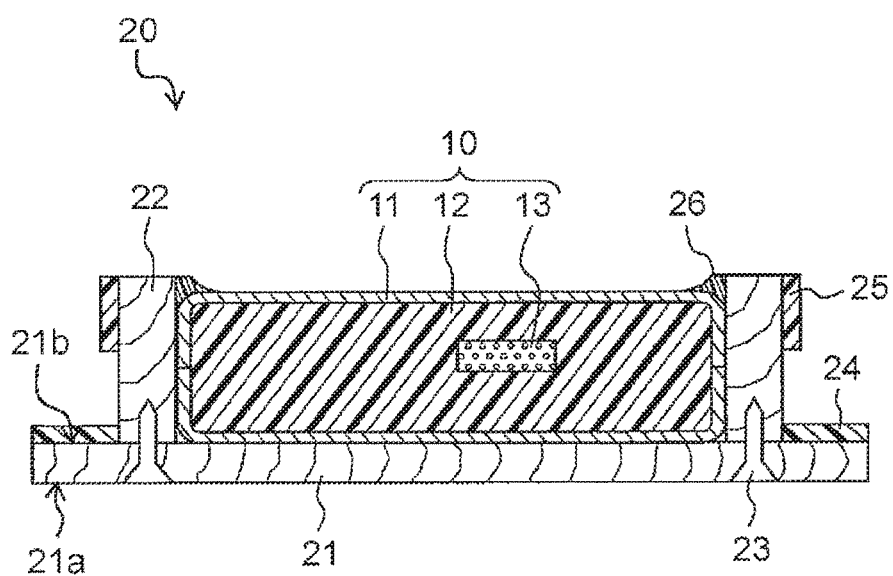
FIG. 8 is a schematic sectional view illustrating a representative configuration of a dwelling wall equipped with a vacuum heat-insulating material according to a sixth exemplary embodiment of the present invention.

As illustrated in FIG. 8, dwelling wall 20 according to the exemplary embodiment is provided with wall material 21, frame body 22, and vacuum heat-insulating material 10. When wall material 21 is provided as a wall of a building, wall material 21 is a wall which has proof stress that resists to a force from the perpendicular direction and the horizontal direction and can support the building. The disclosure is not particularly limited to a specific configuration, and a known configuration can be appropriately used. In addition, in FIG. 8, for convenience of description, although being illustrated as one plate member, wall material 21 may be a panel configured of a column material, a bracing material, or a plywood material.

Front surface 21a of wall material 21 becomes a wall surface of the building, but vacuum heat-insulating material 10 is fixed to rear surface 21b of wall material 21. Therefore, dwelling wall 20 according to the exemplary embodiment becomes a heat-insulating panel material in which wall material 21 and vacuum heat-insulating material 10 are integrated with each other.

Frame body 22 fixes and supports vacuum heat-insulating material 10 to rear surface 21b of wall material 21, and may have a function of reinforcing the proof stress of wall material 21. Frame body 22 is fixed to wall material 21 by nail member 23 inserted from front surface 21a of wall material 21. Vacuum heat-insulating material 10 is disposed in the frame of frame body 22, and a void between frame body 22 and vacuum heat-insulating material 10 is buried by calking material 26.

On rear surface 21b of wall material 21, at a part exposed to the outside of frame body 22 and on the outer circumferential surface of frame body 22, airtight materials 24 and 25 are respectively provided. Airtight materials 24 and 25 function for holding a space between the column or a beam and dwelling wall 20 to be airtight when dwelling wall 20 made as a panel is attached and fixed to the column or the beam of the building. In the disclosure, specific configurations of airtight materials 24 and 25 and calking material 26 are not particularly limited, and a known configuration can be appropriately used.

As described above, since dwelling wall 20 according to the exemplary embodiment is fixed in a state where vacuum heat-insulating material 10 overlaps a large part of wall material 21, it is possible to efficiently heat-insulate the entire wall. However, within the reference temperature range, the linear expansion coefficient of vacuum heat-insulating material 10 is set to be equal to or less than $80 \times 10^{-5}/°C$. Accordingly, for example, similar to the dwelling or the like in an extremely cold place, in a case where dwelling wall 20 is used in a temperature range of $-130°C$ to $80°C$, it is also possible to excellently suppress the degree of expansion and contraction of outer cover material 11. Therefore, even in a case of the use condition that the low-temperature environment or the high-temperature difference environment is generated, for a long period of time, it is possible to realize at least one of excellent strength and durability of outer cover material 11. As a result, in vacuum heat-insulating material 10, it is possible to further optimize the reliability of outer cover material 11 in order to make it possible to employ vacuum heat-insulating material 10 in dwelling wall 20 or the like.

In addition, dwelling wall 20 according to the exemplary embodiment may have a configuration in which vacuum heat-insulating material 10 and wall material 21 are provided, and vacuum heat-insulating material 10 is disposed on rear surface 21b side of wall material 21, and for example, frame body 22 or the like may not be provided. Furthermore, dwelling wall 20 according to the exemplary embodiment becomes a "heat-insulating panel material" which is made as a panel, but a specific configuration as the heat-insulating panel material is not limited to a configuration disclosed in the exemplary embodiment, and a configuration of a known heat-insulating panel material can be employed.

In addition, in the exemplary embodiment, after making dwelling wall 20 as a panel, frame body 22 is fixed to wall material 21, but a fixing method of frame body 22 is not limited to a method which uses nail member 23, and may be a method which uses a fixing member other than nail member 23 or may be a method of configuring a recessed portion and a projected portion (may be reverse to each other) in each of wall material 21 and frame body 22 and combining and fixing the recessed portion and the projected portion.

Furthermore, it is not necessary to make dwelling wall 20 according to the exemplary embodiment as a panel as a heat-insulating panel, and when the dwelling wall is used as the wall of dwelling, vacuum heat-insulating material 10 may be fixed to rear surface 21b of wall material 21. Therefore, when the dwelling is built, on the construction site, dwelling wall 20 according to the exemplary embodiment can be assembled at any time.

Seventh Exemplary Embodiment

Next, a seventh exemplary embodiment will be described.

In the sixth exemplary embodiment, an example in which vacuum heat-insulating material 10 according to the disclosure is used as the heat-insulating material of dwelling wall 20 is described, but the present invention is not limited thereto, and a heat-insulating material other than dwelling wall 20 can be appropriately used. For example, in the seventh exemplary embodiment, vehicle 30 is described as an example.

Figure 9:
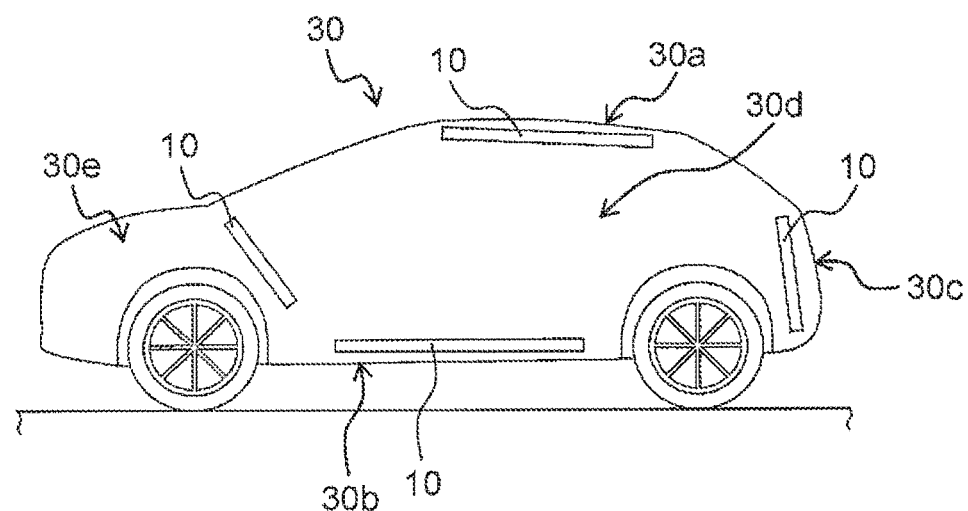
FIG. 9 is a schematic view illustrating a representative configuration of a vehicle equipped with a vacuum heat-insulating material according to a seventh exemplary embodiment of the present invention.

As illustrated in FIG. 9, as vehicle 30 according to the exemplary embodiment, when a general passenger car is illustrated as an example, vacuum heat-insulating material 10 according to the disclosure is appropriately used as a heat-insulating material disposed at each part, such as a boundary surface between ceilings 30a, floor 30b, back surface 30c and the inside of vehicle 30d and engine room 30e of vehicle 30. By using vacuum heat-insulating material 10 in ceiling 30a, floor 30b, and back surface 30c, and further a rear door which is not illustrated, when the temperature difference between the temperature on the inside of vehicle 30d and the outdoor temperature is large, it is also possible to excellently heat-insulate the inside of vehicle 30d. In addition, it is also possible to excellently heat-generate from an engine which is not illustrated on the inside of engine room 30e, and to excellently perform heat-insulation by vacuum heat-insulating material 10.

In particular, in a case where vehicle 30 is used in a temperature range of −130° C. to 80° C. similar to an extremely cold place, it is possible to excellently suppress the degree of expansion and contraction of outer cover material 11. Therefore, even in a case of the use condition that the low-temperature environment or the high-temperature difference environment is generated, for a long period of time, it is possible to realize at least one of excellent strength and durability of outer cover material 11. As a result, in vacuum heat-insulating material 10, it is possible to further optimize the reliability of outer cover material 11 in order to make it possible to employ vacuum heat-insulating material 10 in vehicle 30.

In addition, in the exemplary embodiment, as vehicle 30 in which vacuum heat-insulating material 10 according to the disclosure is employed, a passenger car is illustrated as an example, but the disclosure is not limited thereto, and vehicle 30 may be a vehicle, such as a bus and a truck. In addition, vehicle 30 is not limited to a configuration which is driven by fuel, such as gasoline, diesel, or LNG, and may be an electric vehicle.

Vehicle 30 illustrated as an example in the exemplary embodiment is a representative example of a transport machine configured by using the vacuum heat-insulating material according to the disclosure. As the transport machine, other than vehicle 30 (a passenger car, a bus, or a truck), a railroad, an airplane, and a ship are included. Furthermore, a target to be transported, such as a trailer, a container, and a tank which are transported by the transport machines is also included (therefore, LNG transport tankers 100A and 100B illustrated as an example in the second exemplary embodiment or the third exemplary embodiment and hydrogen tank 140 illustrated as an example in the fifth exemplary embodiment are an example of the heat-insulating container, and are illustrated as an example of the transport machine).

EXAMPLE

Next, the disclosure will be described more specifically by using examples and a comparative example, but the present invention is not limited to the examples. Those skilled in the art can perform change, correction, and improvement in various manners without departing a range of the present invention.

First, the evaluation of temperature dependence of the linear expansion coefficient in the following examples and the comparative example is performed as illustrated next.

(Evaluation of Temperature Dependence of Linear Expansion Coefficient)

An outer cover material of the examples and the comparative example is a sample cut out into a predetermined size. At this time, the sample is collected from a part which does not have an adhesive material in the outer cover material without a folded part of the outer cover material. As a test machine, TMA2940 type (name of a product) manufactured by TA Instruments is used in Example 1, Example 2, and the comparative example, and Q400EM type (name of a product) manufactured by TA Instruments is used in Example 3. In addition, on a condition that a measuring mode is static tension, a temperature rising speed is 5° C./minute, tensile stress is 0.05 N (Example 1, Example 2, and the comparative example) or 0.4 N (Example 3), and in-vessel temperature holding time before the test is 10 minutes, by changing the temperature within the range of −140° C. to +150° C., the linear expansion coefficient is measured. The atmospheric gas type and the gas flow rate are set to be nitrogen and 140 mL/minute in the TMA2940 type, and are set to be argon and 100 mL/minute in Q400EM type. In addition, the MD direction of the sample is a crystal orientation direction of the outermost layer among the front surface protecting layers that configure the outer cover material.

Example 1

As the outer cover material of the vacuum heat-insulating material, a laminated film having a four-layered structure of nylon layer/nylon layer/aluminum foil layer/polyethylene layer is used. In addition, in the laminated film, two layers of nylon layer/nylon layer are a front surface protecting layer, the aluminum foil layer is a gas barrier layer, and the polyethylene layer is a thermal welding layer. The laminated film is cut out into a size of 12.5±0.5 mm×5 mm, and as described above, the temperature dependence of a coefficient of thermal expansion is evaluated. The linear expansion coefficient in the MD direction of the laminated film is illustrated by a graph illustrated by a solid line of FIG. 10, and the linear expansion coefficient in the TD direction is illustrated by a graph illustrated by a broken line of FIG. 10.

In addition, in the laminated film, the tensile strength at break at an atmosphere of −130° C. is 201 MPa, the maximum value of the linear expansion coefficient in the MD direction is $53.5 \times 10^{-5}/°C$., and the average value (MD average linear expansion coefficient Cmd) within the reference temperature range is $19.9 \times 10^{-5}/°C$. In addition, the maximum value of the linear expansion coefficient in the TD direction is $64.6 \times 10^{-5}/°C$., the average value (TD average linear expansion coefficient Ctd) within the reference temperature range is $13.7 \times 10^{-5}/°C$., and Cmd/Ctd is 1.45.

Example 2

As the outer cover material for the vacuum heat-insulating material, a laminated film having a six-layered structure of nylon layer/polyethylene terephthalate layer/metal deposition layer/metal deposition layer/ethylene-vinyl alcohol copolymer layer/polyethylene layer is used. In addition, in the laminated film, the nylon film is the front surface protecting layer, the four layers of polyethylene terephthalate layer/metal deposition layer/metal deposition layer/ethylene-vinyl alcohol copolymer layer are gas barrier layers, and the polyethylene layer is a thermal welding layer. The laminated film is cut out into a size of 12.5±0.5 mm×5 mm, and as described above, the temperature dependence of a coefficient of thermal expansion is evaluated. The linear expansion coefficient in the MD direction of the laminated film is illustrated by a graph illustrated by a solid line of FIG. 11, and the linear expansion coefficient in the TD direction is illustrated by a graph illustrated by a broken line of FIG. 11.

In addition, in the laminated film, the tensile strength at break at an atmosphere of −130° C. is 209 MPa, the maximum value of the linear expansion coefficient in the MD direction is 48.1×10⁻⁵/° C., the average value (MD average linear expansion coefficient Cmd) within the reference temperature range is 20.3×10⁻⁵/° C., the maximum value of the linear expansion coefficient in the TD direction is 43.7×10⁻⁵/° C., the average value (TD average linear expansion coefficient Ctd) within the reference temperature range is 16.2×10⁻⁵/° C., and Cmd/Ctd is 1.25.

Comparative Example 1

As the outer cover material for comparison, a laminated film having a two-layered structure of nylon layer/polyethylene layer is used. The laminated film is cut out into a size of 12.5±0.5 mm×5 mm, and as described above, the temperature dependence of a coefficient of thermal expansion is evaluated. The linear expansion coefficient in the MD direction of the laminated film is illustrated by a graph illustrated by a solid line of FIG. 12, and the linear expansion coefficient in the TD direction is illustrated by a graph illustrated by a broken line of FIG. 12.

In addition, in the laminated film, the tensile strength at break at an atmosphere of −130° C. is 172 MPa, the maximum value of the linear expansion coefficient in the MD direction is 97.3×10⁻⁵/° C., and the maximum value of the linear expansion coefficient in the TD direction is 48.4×10⁻⁵/° C.

Example 3

As the outer cover material for the vacuum heat-insulating material, a laminated film which is the same as that of Example 1 is used, the laminated film is cut out into a size of 8.0±0.1 mm×5 mm, and in each of the second reference temperature range (temperature range of −140° C. to −130° C.), the third reference temperature range (temperature range of −140° C. to −110° C.), and the fourth reference temperature range (temperature range of +50° C. to +65° C.), the average value of the linear expansion coefficient is calculated. The result thereof is illustrated in Table 1.

Comparative Example 2

As the outer cover material for the vacuum heat-insulating material, other than a laminated film having a seven-layered structure of polyethylene terephthalate layer/metal deposition layer/polyethylene terephthalate layer/metal deposition layer/polyethylene terephthalate layer/metal deposition layer/polyethylene layer, similar to Example 3, in each of the second reference temperature range, the third reference temperature range, and the fourth reference temperature range, the average value of the linear expansion coefficient is calculated. The result thereof is illustrated in Table 1.

TABLE 1

| Reference temperature range | Average value of linear expansion coefficient (×10⁻⁵/° C.) | | |
| --- | --- | --- | --- |
| | Second −140° C. to −130° C. | Third −140° C. to −110° C. | Fourth +50° C. to +60° C. |
| Example 3 | 115.7 | 44.4 | 19.5 |
| Comparative example 2 | 5.8 | 4.5 | 5.9 |

Comparison of Examples and Comparative Example

Figure 10:
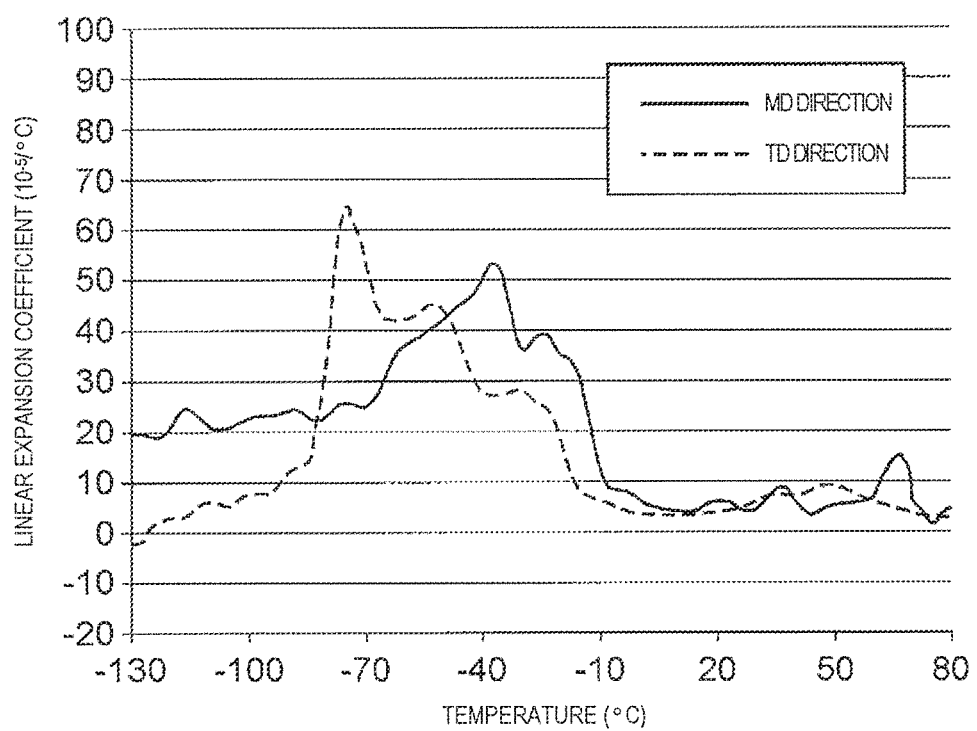
FIG. 10 is a view illustrating temperature dependence of a linear expansion coefficient in a TD direction and in an MD direction with respect to an outer cover material provided in a vacuum heat-insulating material, in Example 1 of the present invention.
Figure 11:
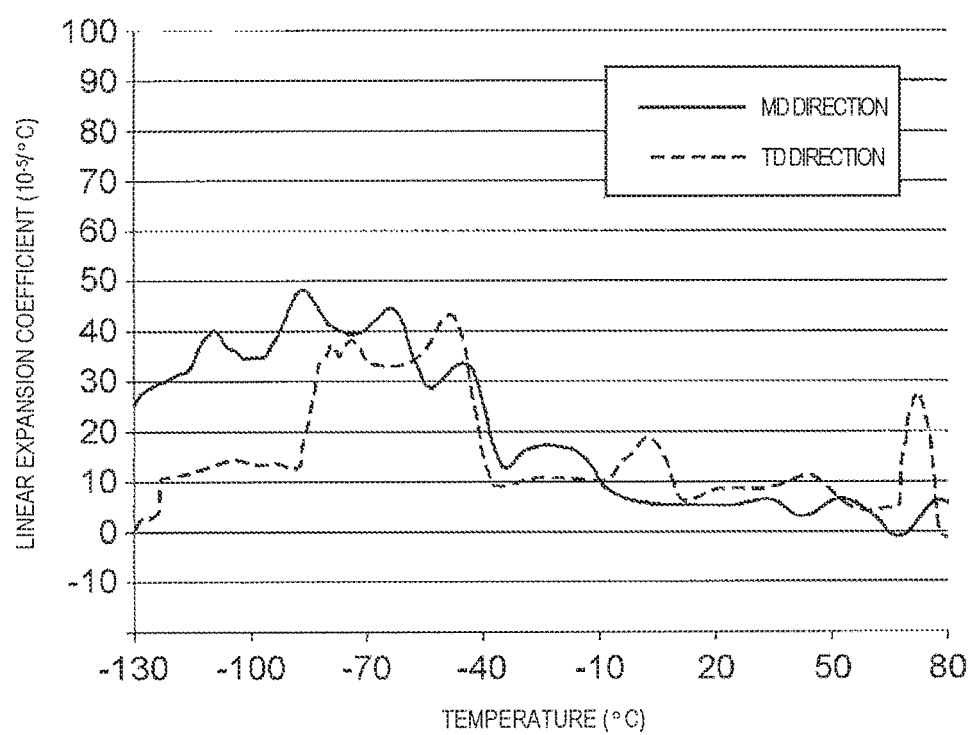
FIG. 11 is a view illustrating temperature dependence of a linear expansion coefficient in a TD direction and in an MD direction with respect to an outer cover material provided in a vacuum heat-insulating material, in Example 2 of the present invention.
Figure 12:
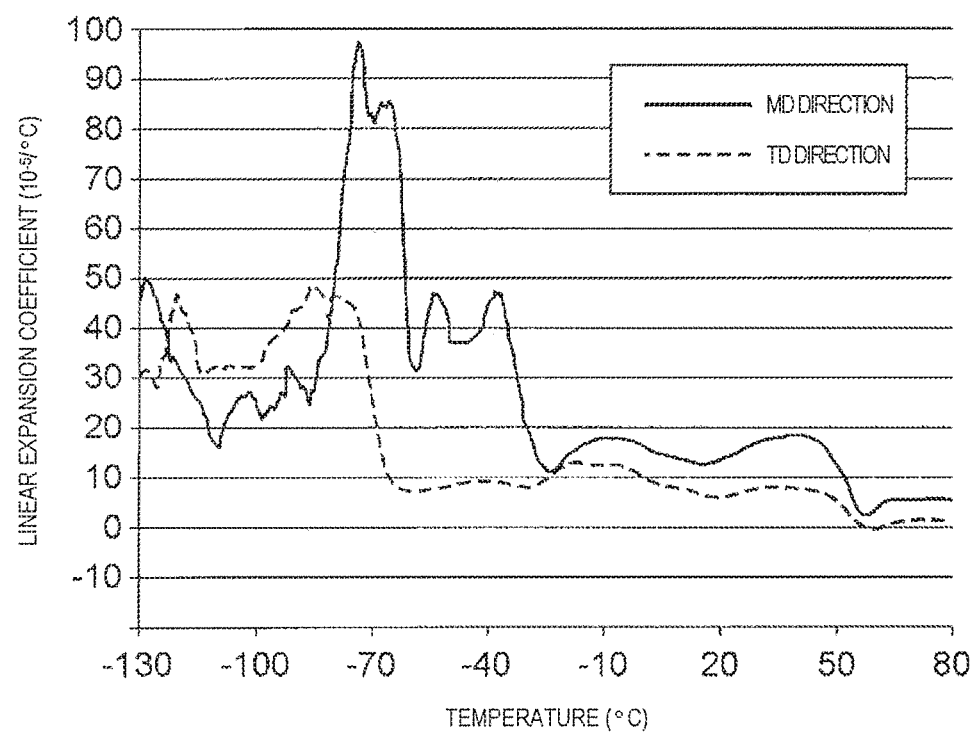
FIG. 12 is a view illustrating temperature dependence of a linear expansion coefficient in a TD direction and in an MD direction with respect to an outer cover material provided in a vacuum heat-insulating material, in a comparative example of the present invention.

As illustrated in FIGS. 10 to 12, in the laminated film (outer cover material) of Example 1 and Example 2, the linear expansion coefficients in any of the MD direction and the TD direction are lower than 80×10⁻⁵/° C. in the reference temperature range of −130° C. to +80° C. Accordingly, in the vacuum heat-insulating material which uses the laminated film of Example 1 and Example 2 as the outer cover material, in the first reference temperature range (temperature range of −130° C. to +80° C.) and the periphery temperature range thereof, the degree of expansion and contraction of the outer cover material can be excellently suppressed. Therefore, it can be ascertained that the laminated films are outer cover materials which can also realize at least one of excellent strength and durability under the low-temperature environment or the high-temperature difference environment.

Meanwhile, in the laminated film of Comparative Example 1, in the MD direction, the linear expansion coefficient illustrates 97×10⁻⁵/° C. in the vicinity of −80° C. to −70° C. Therefore, since the expansion and contraction becomes strict in the vicinity of the temperature, it can be ascertained that it is difficult to realize at least one of excellent strength and durability under the low-temperature environment or the high-temperature difference environment, and the laminated film is not preferable as the outer cover material.

In addition, as illustrated in Table 1, in the laminated film (outer cover material) of Example 3, in any of the second reference temperature range (temperature range of −140° C. to −130° C.), the third reference temperature range (temperature range of −140° C. to −110° C.), and the fourth reference temperature range (temperature range of +50° C. to +65° C.), the average value exceeds the lower limit value of a predetermined linear expansion coefficient. Meanwhile, in the outer cover material of Comparative Example 2, in any of the second reference temperature range, the third reference temperature range, and the fourth reference temperature range, the average value is lower than the lower limit value of a predetermined linear expansion coefficient. When the outer cover material satisfies any of the temperature-linear expansion coefficient conditions (2) to (4), in the corresponding reference temperature range and the periphery temperature range thereof, it is possible to excellently control the expansion and contraction properties of the outer cover material.

In addition, the present invention is not limited to the description of the above-described exemplary embodiments, various changes are possible within a range illustrated in the range of the claims, and exemplary embodiments obtained by appropriately combining technical means that are respectively illustrated in different exemplary embodiments or the plurality of modification examples, are included in the technical range of the disclosure.

As described above, a vacuum heat-insulating material according to a first aspect of the disclosure includes: an outer cover material including at least a resin component; and a core material which is sealed in a tightly closed and decompressed state on the inside of the outer cover material. In addition, the outer cover material has gas barrier properties and satisfies at least one of (1) a condition that a linear expansion coefficient is $80\times10^{-5}/°$ C. or lower when a static load is 0.05 N within a temperature range of $-130°$ C. to $80°$ C., inclusive, (2) a condition that an average value of a linear expansion coefficient is $65\times10^{-5}/°$ C. or higher when a static load is 0.4 N within a temperature range of $-140°$ C. to $-130°$ C., inclusive, (3) a condition that an average value of a linear expansion coefficient is $20\times10^{-5}/°$ C. or higher when a static load is 0.4 N within a temperature range of $-140°$ C. to $-110°$ C., inclusive, and (4) a condition that an average value of a linear expansion coefficient is $13\times10^{-5}/°$ C. or higher when a static load is 0.4 N within a temperature range of $+50°$ C. to $+65°$ C., inclusive.

According to the configuration, the outer cover material provided in the vacuum heat-insulating material regulates the upper limit value of the linear expansion coefficient in a predetermined static load or the lower limit value of the average value in the predetermined "reference temperature range" in any of the temperature-linear expansion coefficient conditions (1) to (4). Accordingly, in the reference temperature range and a periphery temperature range thereof, it is possible to excellently control a degree of expansion and contraction of the outer cover material. Therefore, in a use condition in which the low-temperature environment or the high-temperature difference environment is generated, it is also possible to realize at least one of excellent strength and excellent durability of the outer cover material for a long period of time. As a result, in the vacuum heat-insulating material, it is possible to further optimize reliability of the outer cover material to make it possible to employ the vacuum heat-insulating material in an industrial product.

In addition, according to a second aspect of the disclosure, in the first aspect, tensile strength at break of the outer cover material in an atmosphere of $-130°$ C. may be equal to or greater than 180 MPa.

According to the configuration, furthermore, in the outer cover material provided in the vacuum heat-insulating material, not only the upper limit value of the linear expansion coefficient in the reference temperature range is regulated, but also the lower limit value of the tensile strength at break is regulated in the lower limit value of the reference temperature range. Accordingly, since it is possible to more preferably optimize the mechanical strength under the low-temperature environment, it is possible to achieve more excellent strength and durability of the outer cover material.

In addition, according to a third aspect of the disclosure, in the first aspect or the second aspect, the outer cover material may satisfy at least one of the above-described conditions (1) to (4) at least in one of an MD direction and a TD direction.

According to the configuration, furthermore, regarding at least one, and preferably both of the mechanical extending direction (the MD direction and the longitudinal direction) and the width direction (the TD direction and the lateral direction) of the outer cover material, at least one of the above-described conditions (1) to (4) is regulated. Accordingly, in a use condition that the low-temperature environment or the high-temperature difference environment is generated, it is possible to realize more excellent strength and durability of the outer cover material for a long period of time.

In addition, according to a fourth aspect of the disclosure, in the third aspect, Cmd/Ctd of the outer cover material may be equal to or less than 3 when an average value of a linear expansion coefficient in the TD direction in the temperature range is Ctd and when an average value of a linear expansion coefficient in the MD direction in the temperature range is Cmd.

According to the configuration, furthermore, since the upper limit value of Cmd/Ctd is regulated, in a use condition that the low-temperature environment or the high-temperature difference environment is generated, it is possible to realize more excellent strength and durability of the outer cover material for a long period of time.

In addition, according to a fifth aspect of the disclosure, in any aspect from the first aspect to the fourth aspect, the outer cover material may be a laminated film including a resin layer and a gas barrier layer.

According to the configuration, furthermore, since the outer cover material is the laminated film, in accordance with all of the conditions, by optimizing at least one of the plurality of layers, it is possible to obtain an outer cover material in which the linear expansion coefficient is regulated to be equal to or less than the above-described upper limit value.

In addition, according to a sixth aspect of the disclosure, in the fifth aspect, the gas barrier layer may include at least one of a metal foil layer or a metal deposition layer.

According to the configuration, furthermore, since the gas barrier layer is a metal layer, it is possible to easily obtain the outer cover material in which the linear expansion coefficient is regulated to be equal to or less than the above-described upper limit value.

In addition, according to a seventh aspect of the disclosure, in the fifth aspect or the sixth aspect, the resin layer may include at least one front surface protecting layer which is positioned on an outer surface side of the gas barrier layer, and at least one thermal welding layer which is positioned on an inner surface side of the gas barrier layer.

According to the configuration, furthermore, since the front surface protecting layer and the thermal welding layer are included in the outer cover material, it is possible to achieve excellent front surface stability of the outer cover material (and the vacuum heat-insulating material), and the core material is also easily sealed on the inside of the outer cover material.

In addition, according to an eighth aspect of the disclosure, there is provided a heat-insulating container including: a heat-insulating structure body equipped with the vacuum heat-insulating material according to any one of the first aspect to the seventh aspect, in which a low-temperature substance is held.

According to the configuration, the vacuum heat-insulating material which is used in the heat-insulating container is provided with the outer cover material that has reliability and can be employed in the industrial product. Therefore, even in a use condition in which the low-temperature environment or the high-temperature difference environment is generated, it is also possible to realize excellent heat-insulation of the heat-insulating container for a long period of time.

In addition, according to a ninth aspect of the disclosure, there is provided a dwelling wall including: the vacuum heat-insulating material according to any one of the first aspect to the seventh aspect.

According to the configuration, furthermore, since the outer cover material has the linear expansion coefficient which is equal to or less than at least the above-described upper limit value, it is possible to appropriately use the outer cover material in the dwelling wall which is assumed to be used under the strict environment.

In addition, according to a tenth aspect of the disclosure, there is provided a transport machine including: the vacuum heat-insulating material according to any one of the first aspect to the seventh aspect.

According to the configuration, furthermore, since the outer cover material has the linear expansion coefficient which is equal to or less than at least the above-described upper limit value, it is possible to appropriately use the outer cover material in the transport machine, such as a ship or a vehicle, which is assumed to be used under a strict environment.

In addition, according to an eleventh aspect of the disclosure, there is provided a hydrogen transport tanker including: the heat-insulating container according to the eighth aspect, in which the low-temperature substance is hydrogen.

Furthermore, according to a twelfth aspect of the disclosure, there is provided an LNG transport tanker including: the heat-insulating container according to the eighth aspect, in which the low-temperature substance is liquefied natural gas (LNG).

In any of the configurations, the vacuum heat-insulating material provided with the outer cover material that has reliability and can be employed in the industrial product is used in the heat-insulating container provided in the tankers. Therefore, in the tankers, when the low-temperature environment or the high-temperature difference environment is generated, it is also possible to achieve excellent heat-insulation of the heat-insulating container for a long period of time.

INDUSTRIAL APPLICABILITY

As described above, according to the present invention, in the vacuum heat-insulating material, it is possible to achieve a special effect that the reliability of the outer cover material can further be optimized to make it possible to employ the vacuum heat-insulating material in the industrial product. Accordingly, the present invention is effective since the present invention can be widely and appropriately used in the vacuum heat-insulating material that is used under the low-temperature environment or the environment where the change in temperature is extreme, and the heat-insulating container, the dwelling wall, the transport machine, the hydrogen transport tanker, and the LNG transport tanker equipped with the vacuum heat-insulating material.

REFERENCE MARKS IN THE DRAWINGS

10 VACUUM HEAT-INSULATING MATERIAL
11 OUTER COVER MATERIAL
11a FRONT SURFACE PROTECTING LAYER
11b GAS BARRIER LAYER
11c THERMAL WELDING LAYER
12 CORE MATERIAL
13 ADSORBENT
14 SEALING PORTION
15 OPENING PORTION
20 DWELLING WALL
21 WALL MATERIAL
21a FRONT SURFACE
21b REAR SURFACE
22 FRAME BODY
23 NAIL MEMBER
24, 25 AIRTIGHT MATERIAL
26 CALKING MATERIAL
30 VEHICLE
30a CEILING
30b FLOOR
30c BACK SURFACE
30d INSIDE OF VEHICLE
30e ENGINE ROOM
50 GROUND SURFACE
100A, 100B LNG TRANSPORT TANKER
101 SPHERICAL TANK (HEAT-INSULATING CONTAINER)
102 SHIP BODY
103 COVER
104 CONTAINER MAIN BODY
105 HEAT-INSULATING STRUCTURE BODY
106 CONTAINER HOUSING
107 SUPPORT BODY
110 INBOARD TANK (HEAT-INSULATING CONTAINER)
111 SHIP BODY
112 DECK
113 PRIMARY MEMBRANE
114 PRIMARY HEAT-INSULATING BOX
115 SECONDARY MEMBRANE
116 SECONDARY HEAT-INSULATING BOX
120 GROUND TYPE LNG TANK (HEAT-INSULATING CONTAINER)
121 SUPPORT STRUCTURE PORTION
122 PROP
123 BRACE
124 CONTAINER MAIN BODY
125 HEAT-INSULATING STRUCTURE BODY
126 CONTAINER HOUSING
130 UNDERGROUND TYPE LNG TANK (HEAT-INSULATING CONTAINER)
131 CONCRETE STRUCTURE BODY
132 ROOF PORTION
133 FIBROUS HEAT-INSULATING MATERIAL
134 CONTAINER MAIN BODY
135 HEAT-INSULATING STRUCTURE BODY
136 CONTAINER HOUSING
140 HYDROGEN TANK (HEAT-INSULATING CONTAINER)
141 SUPPORT BODY
144 CONTAINER MAIN BODY
145 HEAT-INSULATING STRUCTURE BODY
146 CONTAINER HOUSING

The invention claimed is:

1. A heat-insulating container comprising:
a heat-insulating structure body equipped with a vacuum heat-insulating material, the vacuum heat-insulating material including:
an outer cover material including at least a resin component; and
a core material which is sealed in a tightly closed and decompressed state on an inside of the outer cover material,
wherein the outer cover material has gas barrier properties and satisfies at least one of (1) a condition that a linear expansion coefficient is $80 \times 10^{-5}1°$ C. or lower when a static load is 0.05 N within a temperature range of $-130°$ C. to $80°$ C., inclusive, (2) a condition that an average value of a linear expansion coefficient is $65\times10^{-5}/°$ C. or higher when a static load is 0.4 N within a temperature range of −140° C. to −130° C., inclusive, (3) a condition that an average value of a linear expansion coefficient is $20\times10^{-5}/°$ C. or higher when a static load is 0.4 N within a temperature range of −140° C. to −110° C., inclusive, and (4) a condition that an average value of a linear expansion coefficient is $13\times10^{-5}1°$ C. or higher when a static load is 0.4 N within a temperature range of +50° C. to +65° C., inclusive, and wherein a substance is held in the heat-insulating container.

2. The heat-insulating container according to claim 1,
wherein tensile strength at break of the outer cover material of the vacuum heat-insulating material in an atmosphere of −130° C. is equal to or greater than 180 MPa.

3. The heat-insulating container according to claim 1,
wherein the outer cover material of the vacuum heat-insulating material satisfies at least one of conditions (1) to (4) at least in one of a mechanical extending direction and a lateral direction.

4. The heat-insulating container according to claim 3,
wherein Cmd/Ctd of the outer cover material of the vacuum heat-insulating material is equal to or less than 3, where an average value of a linear expansion coefficient in the lateral direction in the temperature range is Ctd and where an average value of a linear expansion coefficient in the mechanical extending direction in the temperature range is Cmd.

5. The heat-insulating container according to claim 1,
wherein the outer cover material of the vacuum heat-insulating material is a laminated film including a resin layer and a gas barrier layer.

6. The heat-insulating container according to claim 5,
wherein the gas barrier layer includes at least one of a metal foil layer or a metal deposition layer.

7. The heat-insulating container according to claim 5,
wherein the resin layer includes at least one front surface protecting layer which is positioned on an outer surface side of the gas barrier layer, and at least one thermal welding layer which is positioned on an inner surface side of the gas barrier layer.

8. A hydrogen transport tanker comprising:
the heat-insulating container according to claim 1, wherein the substance is hydrogen.

9. An LNG transport tanker comprising:
the heat-insulating container according to claim 1, wherein the substance is liquefied natural gas (LNG).

* * * * *

UNITED STATES PATENT AND TRADEMARK OFFICE
CERTIFICATE OF CORRECTION

PATENT NO. : 10,520,135 B2  
APPLICATION NO. : 15/978707  
DATED : December 31, 2019  
INVENTOR(S) : Michihiro Shima et al.

Page 1 of 1

It is certified that error appears in the above-identified patent and that said Letters Patent is hereby corrected as shown below:

On the Title Page

Item (54) and in the Specification, Column 1, Lines 1-7, should read:
--"VACUUM HEAT-INSULATING MATERIAL, AND HEAT-INSULATING CONTAINER, DWELLING WALL, TRANSPORT MACHINE, HYDROGEN TRANSPORT TANKER, AND LNG TRANSPORT TANKER EQUIPPED WITH VACUUM HEAT-INSULATING MATERIAL"--

Signed and Sealed this  
Twenty-sixth Day of May, 2020

Andrei Iancu  
*Director of the United States Patent and Trademark Office*